(12) United States Patent
Matsubara

(10) Patent No.: US 12,058,438 B2
(45) Date of Patent: *Aug. 6, 2024

(54) IMAGE PROCESSING APPARATUS AND IMAGE PROCESSING SYSTEM WITH GAIN CORRECTION BASED ON CORRECTION CONTROL INFORMATION

(71) Applicant: Sony Semiconductor Solutions Corporation, Kanagawa (JP)

(72) Inventor: Yoshiaki Matsubara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,558

(22) Filed: Apr. 10, 2023

(65) Prior Publication Data

US 2023/0388628 A1 Nov. 30, 2023

Related U.S. Application Data

(63) Continuation of application No. 17/261,371, filed as application No. PCT/JP2019/031780 on Aug. 9, 2019, now Pat. No. 11,647,284.

(30) Foreign Application Priority Data

Aug. 20, 2018 (JP) ................... 2018-153930

(51) Int. Cl.
*H04N 23/60* (2023.01)
*G06T 5/50* (2006.01)
(Continued)

(52) U.S. Cl.
CPC ............ *H04N 23/665* (2023.01); *G06T 5/50* (2013.01); *H04N 23/66* (2023.01); *H04N 23/951* (2023.01)

(58) Field of Classification Search
None
See application file for complete search history.

(56) References Cited

U.S. PATENT DOCUMENTS 6,249,616 B1 6/2001 Hashimoto
10,009,551 B1 6/2018 Adcock et al.
(Continued)

FOREIGN PATENT DOCUMENTS

CN 101616260 A 12/2009
CN 102236890 A 11/2011
(Continued)

OTHER PUBLICATIONS

International Search Report (PCT/ISA/210), International Application No. PCT/JP2019/031780, dated Sep. 20, 2019.
(Continued)

*Primary Examiner* — Quan Pham
(74) *Attorney, Agent, or Firm* — Michael Best & Friedrich LLP

(57) ABSTRACT

Provided is an image processing apparatus (200), comprising: a communicating unit (202) capable of communicating with each of a plurality of image sensors configured to transmit, in respectively different packets, additional data including region information corresponding to a region set with respect to a captured image for each region and region image data indicating an image for each row corresponding to the region; and a processing unit (204) configured to process, in association with each region, the region image data acquired from each of the plurality of image sensors based on the region information included in the additional data acquired from each of the plurality of image sensors, wherein the region information includes a part of or all of
(Continued)

identification information of the region, information indicating a position of the region, and information indicating a size of the region.

10 Claims, 17 Drawing Sheets

(51) Int. Cl.
    *H04N 23/66* (2023.01)
    *H04N 23/951* (2023.01)

(56) References Cited

U.S. PATENT DOCUMENTS

| | | | |
|---|---|---|---|
| 2003/0133019 | A1 | 7/2003 | Higurashi |
| 2010/0157078 | A1* | 6/2010 | Atanassov ............... G06T 5/50 348/222.1 |
| 2012/0062694 | A1 | 3/2012 | Muramatsu |
| 2013/0208140 | A1* | 8/2013 | Quast ................... H04N 23/698 348/229.1 |
| 2015/0103178 | A1 | 4/2015 | Itoh et al. |
| 2015/0172539 | A1 | 6/2015 | Neglur |
| 2015/0353011 | A1 | 12/2015 | Baek |
| 2016/0065874 | A1 | 3/2016 | Matsumura |
| 2018/0324475 | A1 | 11/2018 | Usami et al. |
| 2019/0149751 | A1 | 5/2019 | Wise |

FOREIGN PATENT DOCUMENTS

| | | |
|---|---|---|
| CN | 102273212 A | 12/2011 |
| CN | 102804791 A | 11/2012 |
| CN | 102892008 A | 1/2013 |
| CN | 104284064 A | 1/2015 |
| CN | 107925738 A | 4/2018 |
| CN | 107950017 A | 4/2018 |
| EP | 2814237 A1 | 12/2014 |
| JP | 2003-219271 A | 7/2003 |
| JP | 2006-115006 A | 4/2006 |
| JP | 2013540390 A | 10/2013 |
| JP | 2016-054479 A | 4/2016 |
| JP | 2017212690 A | 11/2017 |
| JP | 2018-129587 A | 8/2018 |
| KR | 20130028095 A | 3/2013 |
| WO | 2013/179335 A1 | 12/2013 |
| WO | 2017/086355 A1 | 5/2017 |
| WO | 2017/203857 A1 | 11/2017 |

OTHER PUBLICATIONS

Notification of Transmittal of the International Search Report and the Written Opinion of the International Searching Authority, or the Declaration (PCT/ISA/220), International Application No. PCT/JP2019/031780, dated Oct. 8, 2019.

Written Opinion of the International Search Authority (PCT/ISA/237), International Application No. PCT/JP2019/031780, dated Oct. 8, 2019.

Sugioka Tatsuya, "1 Image Sensor Formats and Interfaces for IoT Applications", Embedded Vision Summit 2017, May 1, 2017 (May 1, 2017), XP055830507, Retrieved from the Internet: URL:https://www.slideshare.net/embeddedvision/image-sensor-formatsand-interfaces-for-iot-applications-a-presentation-from-sony [retrieved on Aug. 5, 2021].

Extended European Search Report dated Aug. 16, 2021 for corresponding European Application No. 16851664.3.

* cited by examiner

Fig. 8

| Items | Byte |
|---|---|
| ROI ID | 1 or 2 |
| Upper left coordinate | 4 (2 + 2) |
| Height | 2 |
| Width | 2 |

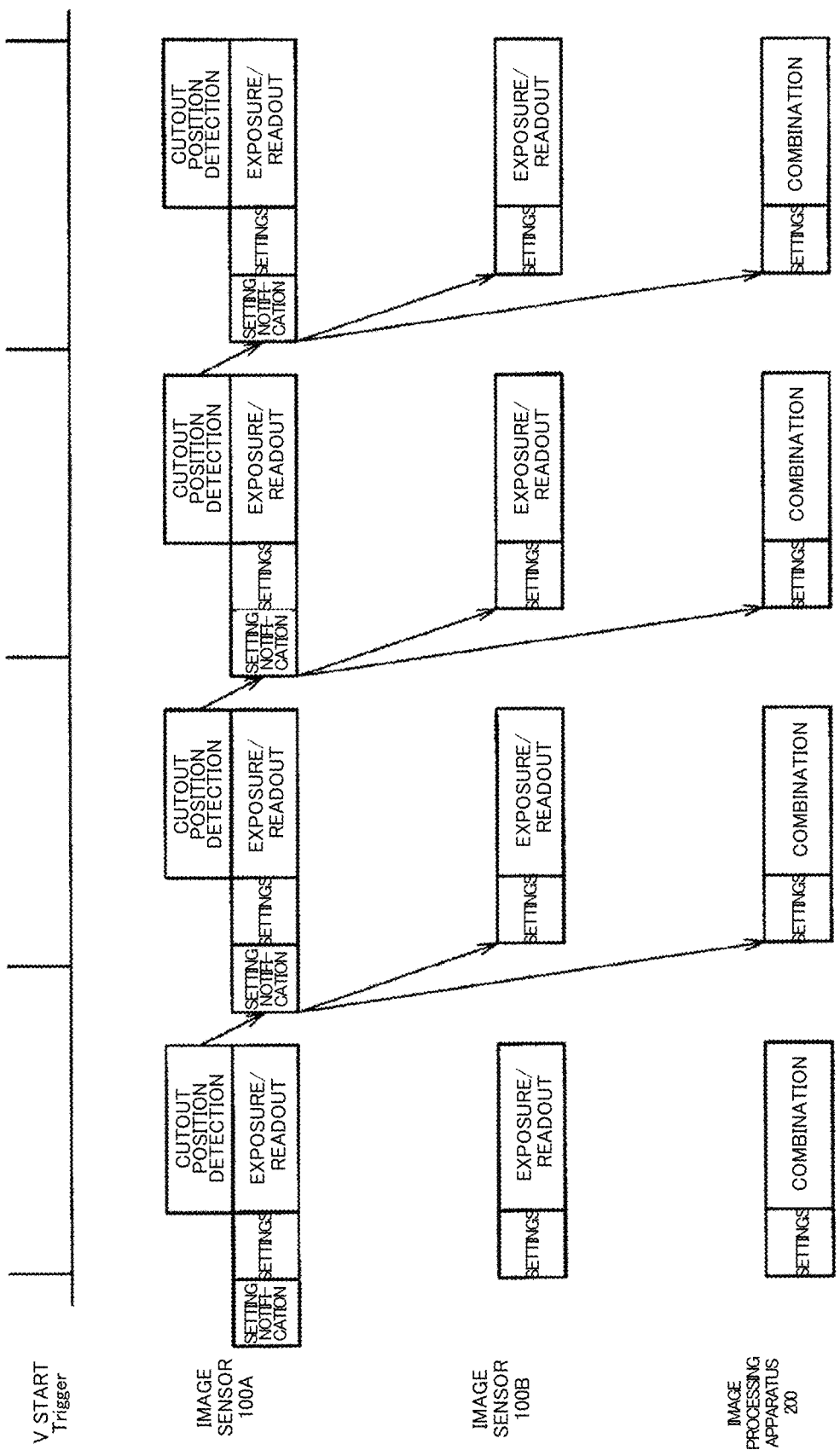

IMAGE PROCESSING APPARATUS AND IMAGE PROCESSING SYSTEM WITH GAIN CORRECTION BASED ON CORRECTION CONTROL INFORMATION

CROSS REFERENCE TO RELATED APPLICATIONS

The present application is a Continuation of application Ser. No. 17/261,371, filed Jan. 19, 2021, which is a 371 National Stage Entry of International Application No.: PCT/JP2019/031780, filed on Aug. 9, 2019, which claims the benefit of Japanese Priority Patent Application JP 2018-153930 filed on Aug. 20, 2018, the entire contents of which are incorporated herein by reference.

TECHNICAL FIELD

The present disclosure relates to an image processing apparatus and an image processing system.

BACKGROUND ART

Techniques related to a compound-eye imaging apparatus that includes a plurality of imaging units are being developed. An example of such techniques is a technique described in PTL 1 below.

CITATION LIST

Patent Literature

[PTL 1]
JP 2007-110499 A

SUMMARY

Technical Problem

For example, in a case where the technique described in PTL 1 is used, when a specific object is detected from an image obtained by imaging by one of the imaging units constituting an imaging apparatus, imaging by the other imaging units constituting the imaging apparatus is performed. However, using the technique described in PTL 1 simply enables a plurality of images to be obtained by imaging and no particular consideration is given to associatively processing the plurality of images obtained by imaging.

The present disclosure proposes a novel and improved image processing apparatus and image processing system capable of associatively processing images respectively obtained from a plurality of image sensors.

Solution to Problem

The present disclosure provides an image processing apparatus, including: a communicating unit capable of communicating with each of a plurality of image sensors configured to transmit, in respectively different packets, additional data including region information corresponding to a region set with respect to a captured image for each region and region image data indicating an image for each row corresponding to the region; and a processing unit configured to process, in association with each region, the region image data acquired from each of the plurality of image sensors based on the region information included in the additional data acquired from each of the plurality of image sensors, wherein the region information includes a part of or all of identification information of the region, information indicating a position of the region, and information indicating a size of the region.

In addition, the present disclosure provides an image processing system, including: a plurality of image sensors configured to transmit, in respectively different packets, additional data including region information corresponding to a region set with respect to a captured image for each region and region image data indicating an image for each row corresponding to the region; and an image processing apparatus, wherein the image processing apparatus includes: a communicating unit capable of communicating with each of the plurality of image sensors; and a processing unit configured to process, in association with each region, the region image data acquired from each of the plurality of image sensors based on the region information included in the additional data acquired from each of the plurality of image sensors, and the region information includes a part of or all of identification information of the region, information indicating a position of the region, and information indicating a size of the region.

Advantageous Effects of Invention

According to the present disclosure, images respectively obtained from a plurality of image sensors can be associatively processed.

It should be noted that the advantageous effect described above is not necessarily restrictive and, in addition to the advantageous effect described above or in place of the advantageous effect described above, any of the advantageous effects described in the present specification or other advantageous effects that can be comprehended from the present specification may be produced.

BRIEF DESCRIPTION OF DRAWINGS

FIG. 8 is an explanatory diagram for explaining an example of region information included in the Embedded Data shown in FIG. 7.

FIG. 17 is an explanatory diagram for explaining an example of processing in the information processing system according to the present embodiment.

DESCRIPTION OF EMBODIMENTS

Hereinafter, a preferred embodiment of the present disclosure will be described in detail with reference to the accompanying drawings. In the present specification and the drawings, components having substantially a same functional configuration will be denoted by same reference signs and overlapping descriptions thereof will be omitted.

In addition, hereinafter, descriptions will be given in an order described below.

1. Transmission method according to present embodiment, image processing method according to present embodiment, and image processing system according to present embodiment
  [1] Configuration of image processing system to which transmission method according to present embodiment can be applied
  [2] Application example of image processing system according to present embodiment
  [3] Transmission method according to present embodiment
  [4] Configuration example of image sensor and image processing apparatus constituting image processing system according to present embodiment
  [5] Example of processing in image processing system according to present embodiment
  [6] Example of advantageous effect produced by using image processing system according to present embodiment
2. Program according to present embodiment Transmission Method According to Present Embodiment, Image Processing Method According to Present Embodiment, and Image Processing System According to Present Embodiment

[1] Configuration of Image Processing System to which Transmission Method According to Present Embodiment can be Applied First, an example of a configuration of an image processing system to which a transmission method according to the present embodiment can be applied will be described.

Hereinafter, a case where a communication system between apparatuses that constitute the image processing system according to the present embodiment is a communication system in compliance with the MIPI (Mobile Industry Processor Interface) CSI-2 (Camera Serial Interface 2) standard will be described as an example. However, the communication system between apparatuses that constitute the image processing system according to the present embodiment is not limited to a communication system in compliance with the MIPI CSI-2 standard. For example, communication between apparatuses that constitute the image processing system according to the present embodiment may satisfy another standard developed by the MIPI Alliance such as a communication system in compliance with the MIPI CSI-3 standard or a communication system in compliance with the MIPI DSI (Digital Serial Interface) standard. In addition, it is needless to say that communication systems to which the transmission method according to the present embodiment can be applied are not limited to communication systems related to standards developed by the MIPI Alliance.

Figure 1:
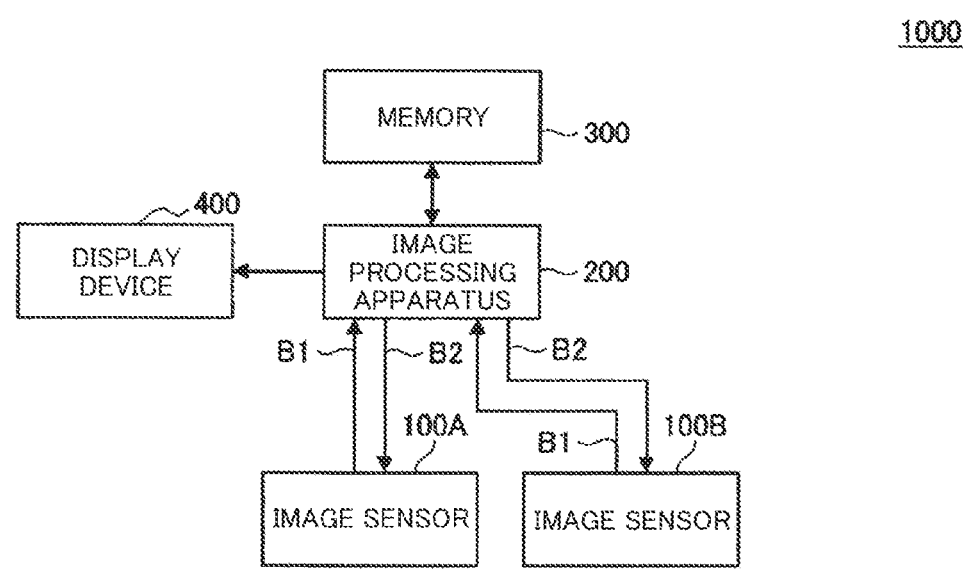
FIG. 1 is an explanatory diagram showing an example of a configuration of an information processing system according to the present embodiment.

FIG. 1 is an explanatory diagram showing an example of a configuration of an image processing system 1000 according to the present embodiment. Examples of the image processing system 1000 include a communication apparatus such as a smartphone and a mobile body such as a drone (a device that can be operated by remote control or a device capable of operating autonomously) or an automobile. Application examples of the image processing system 1000 are not limited to the example described above. Other application examples of the image processing system 1000 will be described later.

For example, the image processing system 1000 has image sensors 100A and 100B, an image processing apparatus 200, a memory 300, and a display device 400. Hereinafter, the term "image sensor 100" will be used when collectively referring to the image sensors 100A and 100B and when referring to one image sensor of the image sensors 100A and 100B.

The image sensor 100 has an imaging function and a transmitting function, and transmits data indicating an image generated by imaging. The image processing apparatus 200 receives the data transmitted from the image sensor 100 and processes the received data. In other words, in the image processing system 1000, the image sensor 100 performs a role of a transmitting apparatus and the image processing apparatus 200 performs a role of a receiving apparatus.

While FIG. 1 shows the image processing system 1000 having two image sensors 100, the number of the image sensors 100 included in the image processing system according to the present embodiment is not limited to the example shown in FIG. 1. For example, the image processing system according to the present embodiment may have three or more image sensors 100.

In addition, in the image processing system according to the present embodiment, a plurality of the image sensors 100 may be modularized. For example, an image sensor module obtained by modularizing a plurality of the image sensors 100 is provided with a plurality of the image sensors 100, a processor (not illustrated) for the image sensor module, and a recording medium that is readable by the processor. The recording medium constituting the image sensor module records, for example, information related to an angle of view (for example, data indicating an angle of view or the like) of the image sensor 100 that constitutes the image sensor module. In addition, the processor that constitutes the image sensor module transmits information related to the angle of view to the image processing apparatus 200 via an arbitrary transmission path.

Furthermore, while FIG. 1 shows the image processing system 1000 having one image processing apparatus 200, the number of the image processing apparatus 200 included in the image processing system according to the present embodiment is not limited to the example shown in FIG. 1. For example, the image processing system according to the present embodiment may have two or more image processing apparatuses 200. In the image processing system having a plurality of the image processing apparatuses 200, a plurality of image sensors 100 correspond to each of the image processing apparatuses 200. Even in an image processing system having a plurality of the image sensors 100 and a plurality of the image processing apparatuses 200, communication is performed between each of the image sensors 100 and the image processing apparatuses 200 in a similar manner to the image processing system 1000 shown in FIG. 1.

The image sensor 100 and the image processing apparatus 200 are electrically connected by a data bus B1. The data bus B1 is a transmission path of a signal that connects the image sensor 100 and the image processing apparatus 200 to each other. For example, data indicating an image (hereinafter, sometimes described as "image data") transmitted from the image sensor 100 is transmitted from the image sensor 100 to the image processing apparatus 200 via the data bus B1.

A signal transmitted by the data bus B1 in the image processing system 1000 is transmitted according to a communication system in compliance with a prescribed standard such as the MIPI CSI-2 standard.

Figure 2:
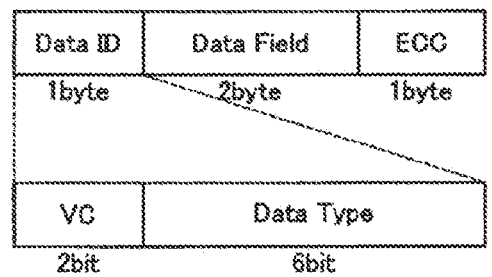
FIG. 2 is an explanatory diagram showing a format of a packet defined in the MIPI CSI-2 standard.
Figure 3:
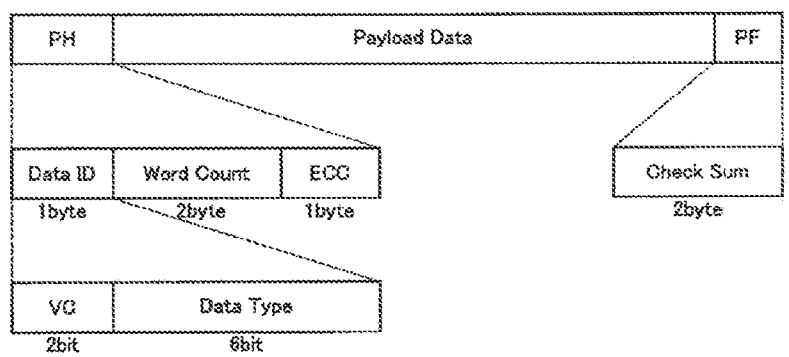
FIG. 3 is an explanatory diagram showing a format of a packet defined in the MIPI CSI-2 standard.

FIGS. 2 and 3 are explanatory diagrams showing a format of a packet defined in the MIPI CSI-2 standard. FIG. 2 shows a format of a short packet defined in the MIPI CSI-2 standard, and FIG. 3 shows a format of a long packet defined in the MIPI CSI-2 standard.

A long packet refers to a piece of data constituted by a packet header ("PH" shown in FIG. 3), a payload ("Payload Data" shown in FIG. 3), and a packet footer ("PF" shown in FIG. 3). A short packet refers to a piece of data having a structure similar to the packet header ("PH" shown in FIG. 3) as shown in FIG. 2.

In both a short packet and a long packet, a VC (Virtual Channel) number ("VC" shown in FIGS. 2 and 3: a VC value) is recorded in the header portion and an arbitrary VC number may be assigned for each packet. Packets to which a same VC number is assigned are handled as packets belonging to a same piece of image data.

In addition, in both a short packet and a long packet, a DT (Data Type) value ("Data Type" shown in FIGS. 2 and 3) is recorded in the header portion.

Therefore, in a similar manner to the VC number, packets to which a same DT value is assigned can also be handled as packets belonging to a same piece of image data.

An end of the packet is recorded as the number of words in Word Count in the header portion of a long packet. An error correcting code is recorded in ECC in the header portion of a short packet and a long packet.

In the MIPI CSI-2 standard, a high-speed differential signal is used during a period in which a data signal is transmitted and a low power signal is used during a blanking period of the data signal. In addition, the period in which the high-speed differential signal is used is referred to as a period in an HPS (High Speed State) and the period in which the low power signal is used is referred to as a period in an LPS (Low Power State).

Figure 4:
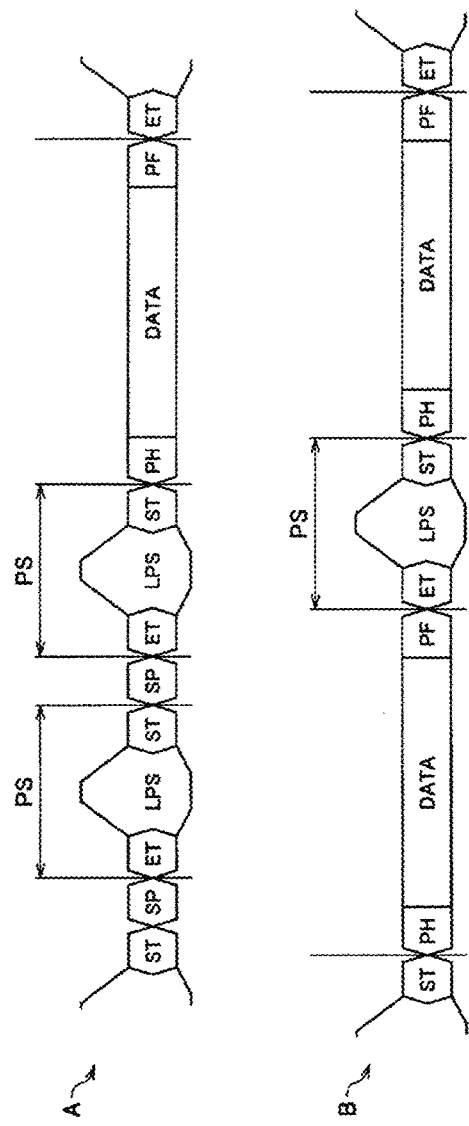
FIG. 4 is an explanatory diagram showing an example of a signal waveform related to transmission of a packet in the MIPI CSI-2 standard.

FIG. 4 is an explanatory diagram showing an example of a signal waveform related to transmission of a packet in the MIPI CSI-2 standard. A in FIG. 4 shows an example of transmission of a packet and B in FIG. 4 shows another example of transmission of a packet. "ST", "ET", "PH", "PF", "SP", and "PS" shown in FIG. 4 are, respectively, abbreviations of the following.

ST: Start of Transmission
ET: End of Transmission
PH: Packet Header
PF: Packet Footer
SP: Short Packet
PS: Packet Spacing As shown in FIG. 4, it is revealed that, between a differential signal ("LPS" shown in FIG. 4) in the period of the LPS and a differential signal (other than "LPS" shown in FIG. 4) in the period of the HPS, amplitudes of the differential signals differ from one another. Therefore, from the perspective of improving transmission efficiency a period of the LPS is included as little as possible.

For example, the image sensor 100 and the image processing apparatus 200 are electrically connected to each other by a control bus B2 that differs from the data bus B1. The control bus B2 is a transmission path of other signals that connects the image sensor 100 and the image processing apparatus 200 to each other.

For example, control information output from the image processing apparatus 200 is transmitted from the image processing apparatus 200 to the image sensor 100 via the control bus B2.

For example, the control information includes information for control and a processing command. Examples of the information for control include data for controlling functions in the image sensor 100 such as one or two or more pieces of data among data indicating an image size, data indicating a frame rate, and data indicating an amount of output delay from reception of an output command of an image to output of the image. In addition, the control information may include identification information indicating the image sensor 100. Examples of the identification information include an arbitrary piece of data that enables the image sensor 100 to be identified such as an ID set to the image sensor 100.

The information transmitted from the image processing apparatus 200 to the image sensor 100 via the control bus B2 is not limited to the example described above. For example, the image processing apparatus 200 may transmit, via the control bus B2, region designation information that designates a region in an image. Examples of the region designation information include data in an arbitrary format that enables a region to be identified such as data indicating a position of a pixel included in the region (for example, coordinate data in which a position of a pixel included in the region is expressed by coordinates).

While FIG. 1 shows an example in which the image sensor 100 and the image processing apparatus 200 are electrically connected to each other by the control bus B2, the image sensor 100 and the image processing apparatus 200 may not be connected by the control bus B2. For example, the image sensor 100 and the image processing apparatus 200 may transmit and receive control information and the like by wireless communication based on an arbitrary communication system.

In addition, while the image sensor 100A and the image sensor 100B are not electrically connected to each other in FIG. 1, alternatively, the image sensor 100A and the image sensor 100B may be electrically connected to each other by a transmission path that enables communication to be performed by an arbitrary communication system. When the image sensor 100A and the image sensor 100B are electrically connected to each other, the image sensor 100A and the image sensor 100B can directly communicate with each other. As an example, the image sensor 100A and the image sensor 100B can communicate with each other by interprocessor communication that involves communicating via a transmission path between processors respectively included in the image sensors 100A and 100B. Even when the image sensor 100A and the image sensor 100B are not electrically connected to each other as shown in FIG. 1, the image sensor 100A and the image sensor 100B can communicate with each other via the image processing apparatus 200.

Hereinafter, each apparatus constituting the image processing system 1000 shown in FIG. 1 will be described.

[1-1] Memory 300

The memory 300 is a recording medium included in the image processing system 1000. Examples of the memory 300 include a volatile memory such as a RAM (Random Access Memory) and a nonvolatile memory such as a flash memory.

The memory 300 operates using power supplied from an internal power supply (not illustrated) that constitutes the image processing system 1000 such as a battery or power supplied from an external power supply of the image processing system 1000.

For example, the memory 300 stores an image output from the image sensor 100. Recording of the image to the memory 300 is controlled by, for example, the image processing apparatus 200.

[1-2] Display Device 400

The display device 400 is a display device included in the image processing system 1000. Examples of the display device 400 include a liquid crystal display and an organic EL display (organic electro-luminescence display). The display device 400 operates using power supplied from an internal power supply (not illustrated) that constitutes the image processing system 1000 such as a battery or power supplied from an external power supply of the image processing system 1000.

For example, various images and screens such as an image output from the image sensor 100, a screen related to an application to be executed in the image processing apparatus 200, and a screen related to an UI (user interface) are to be displayed on a display screen of the display device 400. Display of an image or the like on the display screen of the display device 400 is controlled by, for example, the image processing apparatus 200.

[1-3] Image Sensor 100

The image sensor 100 has an imaging function and a transmitting function, and transmits data indicating an image generated by imaging. As described earlier, the image sensor 100 performs a role of a transmitting apparatus in the image processing system 1000.

Examples of the image sensor 100 include an imaging device such as a digital still camera, a digital video camera, or a stereo camera and an image sensor device of an arbitrary system that is capable of generating an image such as an infrared sensor or a distance image sensor, and the image sensor 100 has a function of transmitting a generated image. An image generated in the image sensor 100 corresponds to data indicating a sensing result in the image sensor 100. An example of a configuration of the image sensor 100 will be described later.

The image sensor 100 transmits image data (hereinafter, referred to as "region image data") that corresponds to a region set with respect to an image by a transmission method according to the present embodiment to be described later. Control related to the transmission of the region image data is performed by, for example, a component (to be described later) that functions as an image processing unit in the image sensor 100. A region set with respect to an image may be referred to as a ROI (Region of Interest). Hereinafter, a region set with respect to an image may be referred to as a "ROI".

Examples of processing related to setting a region with respect to an image include arbitrary processing that enables a partial region in the image to be identified (or arbitrary processing that enables a partial region in the image to be cut out) such as "processing for detecting an object from an image and setting a region including the detected object" or "processing for setting a region designated by an operation performed with respect to an arbitrary operating device".

The processing related to setting a region with respect to an image may be performed by the image sensor 100 or performed by an external apparatus such as the image processing apparatus 200. When the image sensor 100 performs the processing related to setting a region with respect to an image, the image sensor 100 identifies a region according to a result of the processing related to setting a region with respect to an image. In addition, for example, when an external apparatus performs the processing related to setting a region with respect to an image, the image sensor 100 identifies a region based on region designation information acquired from the external apparatus.

By having the image sensor 100 transmit region image data or, in other words, transmit data of a part of an image, a data amount related to transmission is reduced as compared to transmitting an entire image. Therefore, by having the image sensor 100 transmit region image data, for example, various advantageous effects are produced by the reduction in the data amount such as a reduction in transmission time and a reduction in load related to transmission in the image processing system 1000.

Alternatively, the image sensor 100 can also transmit data indicating an entire image.

When the image sensor 100 has a function of transmitting region image data and a function of transmitting data indicating an entire image, the image sensor 100 can selectively switch between transmitting region image data and transmitting data indicating an entire image.

For example, the image sensor 100 transmits region image data or transmits data indicating an entire image depending on an operating mode being set. Setting of an operating mode is performed by, for example, an operation with respect to an arbitrary operating device.

In addition, the image sensor 100 may selectively switch between transmitting region image data and transmitting data indicating an entire image based on region designation information acquired from an external apparatus. For example, when region designation information is acquired from the external apparatus, the image sensor 100 transmits region image data of a region corresponding to the region designation information, and when region designation information is not acquired from the external apparatus, the image sensor 100 transmits data indicating an entire image.

[1-4] Image Processing Apparatus 200

The image processing apparatus 200 receives the data transmitted from the image sensor 100 and processes the received data by, for example, performing processing related to an image processing method according to the present embodiment. As described earlier, the image processing apparatus 200 has a role of a receiving apparatus in the image processing system 1000. An example of a configuration related to processing of data transmitted from the image sensor 100 (a configuration for fulfilling the role as a receiving apparatus) will be described later.

For example, the image processing apparatus 200 is constituted by one or two or more processors constituted by an arithmetic circuit such as an MPU (Micro Processing Unit), various processing circuits, and the like. The image processing apparatus 200 operates using power supplied from an internal power supply (not illustrated) that constitutes the image processing system 1000 such as a battery or power supplied from an external power supply of the image processing system 1000.

The image processing apparatus 200 processes image data acquired from each of the plurality of image sensors 100 by performing processing related to the image processing method according to the present embodiment.

In the image processing system 1000, the image sensor 100 transmits region image data by a transmission system according to a transmission method to be described later. The image processing apparatus 200 associatively processes region image data acquired from each of the plurality of image sensors 100 for each region being set with respect to an image.

More specifically for example, the image processing apparatus 200 combines images indicated by the region image data acquired from each of the plurality of image sensors 100 for each of the regions.

In doing so, the image processing apparatus 200 combines the images indicated by the region image data of an object to be combined by aligning relative positions of the images. For example, the image processing apparatus 200 aligns relative positions of images indicated by region image data based on information related to an angle of view acquired from each of the image sensors 100 having transmitted the region image data (or information related to an angle of view acquired from the image sensor module described earlier: hereinafter, a similar description will apply). In addition, the image processing apparatus 200 may align relative positions of images indicated by region image data by performing arbitrary object detection processing with respect to each of the images indicated by region image data and detecting a corresponding object.

The processing for associating region image data acquired from each of the plurality of image sensors 100 with each region is not limited to the example described above.

For example, the image processing apparatus 200 may combine the images indicated by region image data by matching signal levels. The image processing apparatus 200 realizes a combination of matched signal levels by, for example, "obtaining a correction gain for correcting respective sensitivity ratios of the image sensors 100 having transmitted region image data based on information (to be described later) which is acquired from each of the plurality of image sensors 100 and which is related to imaging by the image sensors 100". In this case, an example of sensitivity of the image sensor 100 is a photoelectric conversion ratio of an image sensor device included in the image sensor 100.

Processing in the image processing apparatus 200 is not limited to the example described above.

For example, the image processing apparatus 200 can perform arbitrary processing that can be performed with respect to image data such as RGB processing, YC processing, and Gamma processing.

In addition, the image processing apparatus 200 performs various types of processing such as processing related to control of recording of image data to a recording medium such as the memory 300, processing related to control of display of an image on a display screen of the display device 400, and processing for executing arbitrary application software. Examples of processing related to control of recording include "processing for transmitting, to a recording medium such as the memory 300, control data including a recording command and data to be recorded in the recording medium". In addition, examples of processing related to control of display include "processing for transmitting, to a display device such as the display device 400, control data including a display command and data to be displayed on a display screen".

Furthermore, the image processing apparatus 200 may control functions in the image sensor 100 by, for example, transmitting control information to the image sensor 100. The image processing apparatus 200 can also control data to be transmitted from the image sensor 100 by, for example, transmitting region designation information to the image sensor 100.

An example of a configuration of the image processing apparatus 200 will be described later.

For example, the image processing system 1000 is configured as shown in FIG. 1. It should be noted that the configuration of the image processing system according to the present embodiment is not limited to the example shown in FIG. 1.

For example, in a case where an image transmitted from the image sensor 100 is stored in a recording medium outside of the image processing system, a case where an image transmitted from the image sensor 100 is stored in a memory provided in the image processing apparatus 200, or a case where an image transmitted from the image sensor 100 is not recorded, the image processing system according to the present embodiment need not have the memory 300.

In addition, the image processing system according to the present embodiment can be configured not to have the display device 400 shown in FIG. 1.

Furthermore, the image processing system according to the present embodiment may have an arbitrary configuration in accordance with functions provided in an electronic device to be described later to which the image processing system according to the present embodiment is to be applied.

[2] Application Example of Image Processing System According to Present Embodiment While an image processing system has been described above as the present embodiment, the present embodiment is not limited to this mode. For example, the present embodiment can be applied to various electronic devices including a communication apparatus such as a smartphone, a mobile body such as a drone (a device that can be operated by remote control or a device capable of operating autonomously) or an automobile, a computer such as a PC (personal computer), a tablet-type apparatus, and a gaming console.

[3] Transmission Method According to Present Embodiment

Next, a transmission method according to the present embodiment will be described. Hereinafter, a case where the transmission method according to the present embodiment is applied to the image sensor 100 will be described.

(1) First Transmission System

Figure 5:
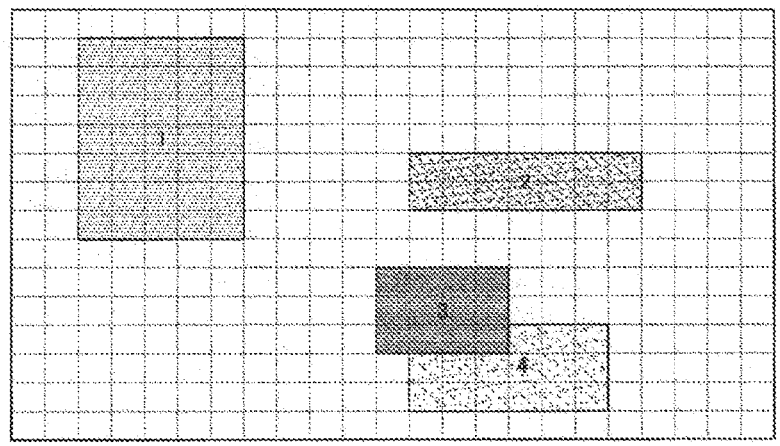
FIG. 5 is an explanatory diagram showing an example of regions to be set with respect to an image.

FIG. 5 is an explanatory diagram showing an example of regions to be set with respect to an image. In FIG. 5, four regions including region 1, region 2, region 3, and region 4 are shown as an example of regions. It is needless to say that the regions to be set with respect to an image are not limited to the example shown in FIG. 5.

For example, the image sensor 100 transmits, in respectively different packets, "additional data including region information corresponding to a region set with respect to an image such as regions 1 to 4 shown in FIG. 5 for each region" and "region image data indicating an image for each row (line) corresponding to the region". When a position of a pixel is to be indicated by two-dimensional planar coordinates (x, y), a row in an image refers to y coordinates being the same.

Region information according to the present embodiment refers to data (a data group) for identifying, from a receiving apparatus side, a region to be set with respect to an image. For example, region information includes a part of or all of identification information of a region, information indicating a position of the region, and information indicating a size of the region.

Information included in region information is not limited to the example described above. Region information may include arbitrary information for identifying, from the receiving apparatus side, a region to be set with respect to an image. For example, when regions are divided by VC numbers, a VC number may perform the role of identification information of a region included in a row. In addition, when regions are divided by VC numbers, a payload length can be substituted for information indicating a size of a region included in a row.

Examples of identification information of a region include an arbitrary piece of data that enables a region to be uniquely identified such as data indicating an ID of a region such as a number added to the region. Hereinafter, identification information of a region may be referred to as an "ROI ID".

Information indicating a position of a region is data indicating a position of the region in an image. An example of information indicating a position of a region is "data indicating an arbitrary position that enables a region to be uniquely identified by being combined with a size of the region indicated by information indicating the size of the region" such as data indicating an upper left position of a region in an image by two-dimensional planar coordinates (x, y).

Examples of information indicating a size of a region include data indicating the number of rows of the region (data indicating the number of pixels in a vertical direction in the region) and data indicating the number of columns of the region (data indicating the number of pixels in a horizontal direction in the region). It should be noted that the information indicating a size of a region may be data in an arbitrary format that enables a size of a region to be identified such as data indicating a rectangular region (for example, data indicating the number of pixels in the horizontal direction and the number of pixels in the vertical direction in the rectangular region).

Hereinafter, an example of processing according to the first transmission system in the image sensor 100 will be described.

The image sensor 100 stores region information in "Embedded Data" of one packet and causes the packet to be transmitted. In addition, the image sensor 100 stores region image data in the payload of another packet and causes the packet to be transmitted per row.

"Embedded Data" refers to data that can be embedded into a packet to be transmitted and corresponds to additional data that is additionally transmitted by the image sensor 100. Hereinafter, Embedded Data may also be referred to as "EBD".

Figure 6:
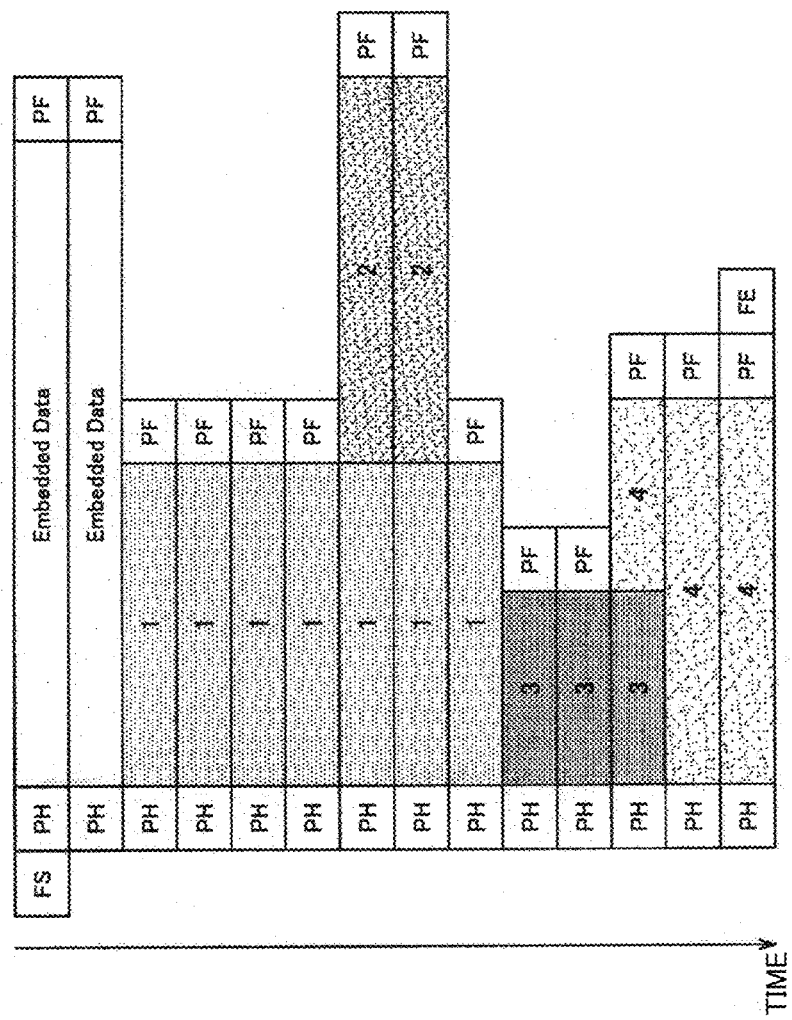
FIG. 6 is an explanatory diagram showing an example of data to be transmitted by a first transmission system related to a transmission method according to the present embodiment.

FIG. 6 is an explanatory diagram showing an example of data to be transmitted by the first transmission system related to a transmission method according to the present embodiment. FIG. 6 represents "an example in which region information respectively corresponding to region 1, region 2, region 3, and region 4 shown in FIG. 5 is stored as "Embedded Data" in the payload of a long packet of MIPI and region image data is stored in the payload of the long packet of MIPI shown in FIG. 3 to be transmitted per row".

"FS" shown in FIG. 6 is an FS (Frame Start) packet in the MIPI CSI-2 standard, and "FE" shown in FIG. 6 is an FE (Frame End) packet in the MIPI CSI-2 standard (a similar description applies to other drawings).

As described above, "Embedded Data" shown in FIG. 6 is data that can be embedded into a packet to be transmitted. For example, "Embedded Data" can be embedded into the header, the payload, or the footer of a packet to be transmitted. In the example shown in FIG. 6, region information is stored in "Embedded Data" of one packet, and the "Embedded Data" in which the region information is stored corresponds to additional data.

The information included in additional data according to the present embodiment is not limited to the example described above. For example, the additional data according to the present embodiment may include information regarding imaging by the image sensor 100. Examples of information regarding imaging by the image sensor 100 include a part of or all of exposure information indicating an exposure value or the like in an image sensor device, gain information indicating a gain in the image sensor device, and sensitivity information indicating a photoelectric conversion ratio in the image sensor device. Each of the exposure value indicated by the exposure information and the gain indicated by the gain information is set to the image sensor device by, for example, control by the image processing apparatus 200 via the control bus B2.

Figure 7:
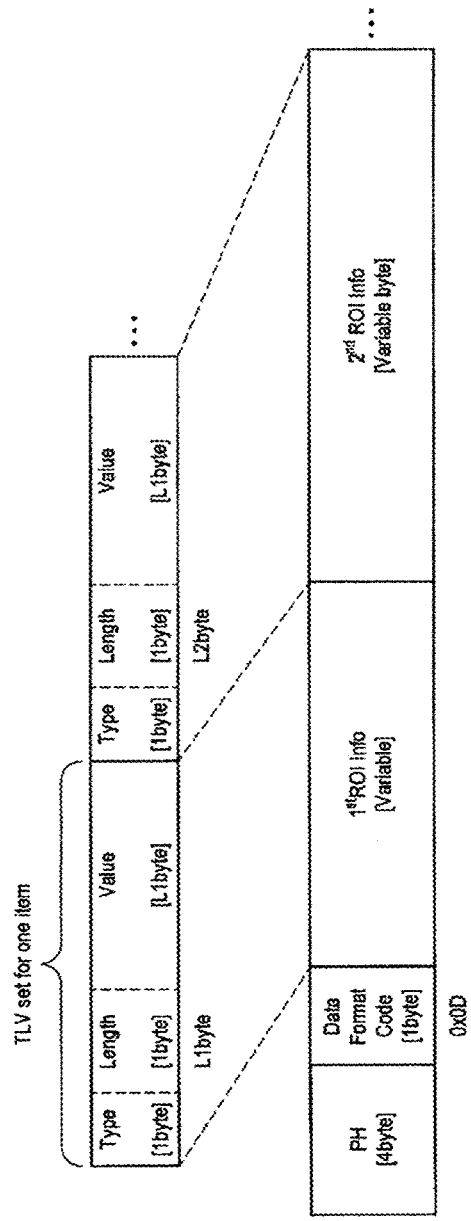
FIG. 7 is an explanatory diagram for explaining an example of Embedded Data to be transmitted by the first transmission system according to the present embodiment.

FIG. 7 is an explanatory diagram for explaining an example of Embedded Data to be transmitted by the first transmission system according to the present embodiment. Data of PH and thereafter shown in FIG. 7 is an example of Embedded Data shown in FIG. 6.

In Embedded Data, a type of data included in Embedded Data is defined by, for example, "Data Format Code".

In the example shown in FIG. 7, each of "1st ROI Info", "2nd ROI Info", . . . following "Data Format Code" corresponds to an example of region information. In other words, Embedded Data shown in FIG. 7 is an example of additional data including region information.

For example, in region information shown in FIG. 7, "Value" includes identification information of a region, information indicating a position of the region, and information indicating a size of the region. In addition, "Value" may include information regarding imaging by the image sensor 100. In the region information shown in FIG. 7, a boundary with other pieces of region information included in Embedded Data is defined by for example, "Length".

FIG. 8 is an explanatory diagram for explaining an example of region information included in the Embedded Data shown in FIG. 7. "ROI ID" shown in FIG. 8 corresponds to identification information of a region and "Upper Left Coordinate" shown in FIG. 8 corresponds to information indicating a position of the region. In addition, "Height" and "Width" shown in FIG. 8 corresponds to information indicating a size of the region.

It is needless to say that a data configuration example of the region information and data included in Embedded Data are not limited to the examples shown in FIG. 7 and FIG. 8.

Once again referring to FIG. 6, an example of data to be transmitted by the first transmission system will be described. Each of "1", "2", "3", and "4" shown in FIG. 6 corresponds to region image data of region 1, region image data of region 2, region image data of region 3, and region image data of region 4 to be stored in a payload of a packet. While each piece of region image data is shown divided in FIG. 6, the divisions are simply indicated for convenience's sake and the data stored in the payload is not divided.

In the first transmission system, region information respectively corresponding to region 1, region 2, region 3, and region 4 shown in FIG. 5 is stored in "Embedded Data" of one packet as shown in FIG. 7 to be transmitted. In addition, in the first transmission system, region image data respectively corresponding to region 1, region 2, region 3, and region 4 shown in FIG. 5 is stored in the payload of a long packet of MIPI as shown in FIG. 6 to be transmitted per row.

(2) Second Transmission System

A transmission method that can be applied to the image processing system 1000 according to the present embodiment is not limited to a transmission method according to the first transmission system.

For example, the image sensor 100 may store region information and region image data in the payload of a packet and cause the packet to be transmitted per row.

Figure 9:
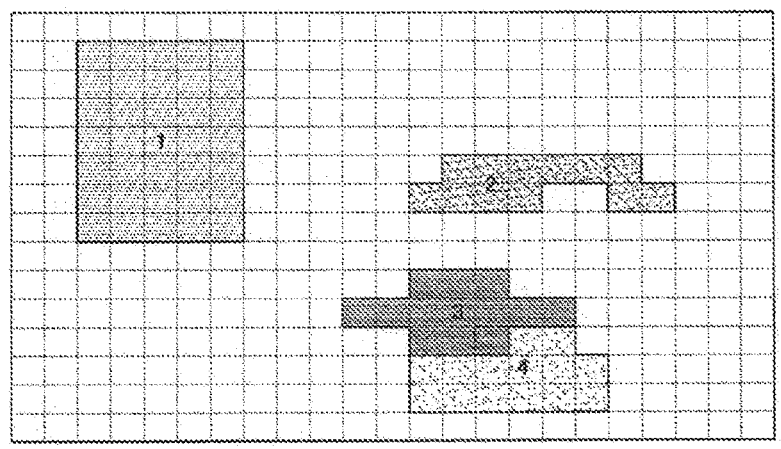
FIG. 9 is an explanatory diagram showing another example of regions to be set with respect to an image.

FIG. 9 is an explanatory diagram showing another example of regions to be set with respect to an image. In FIG. 9, four regions including region 1, region 2, region 3, and region 4 are shown as an example of regions.

Figure 10:
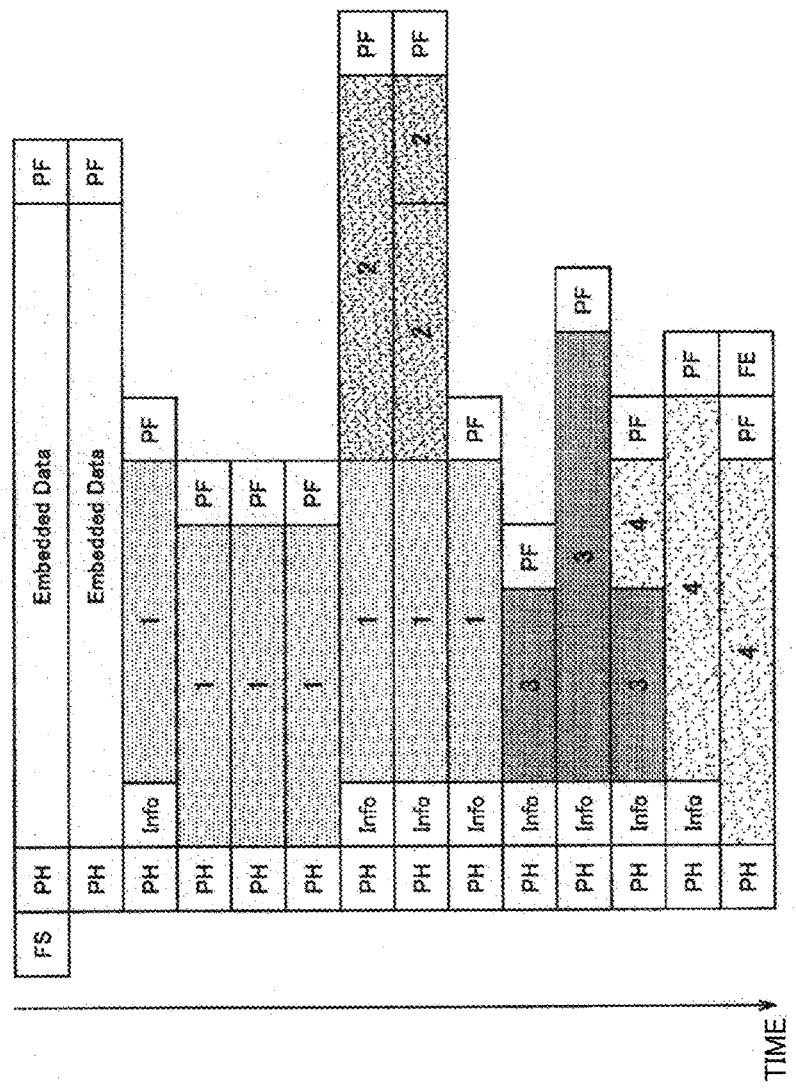
FIG. 10 is an explanatory diagram showing an example of data to be transmitted by a second transmission system related to the transmission method according to the present embodiment.

FIG. 10 is an explanatory diagram showing an example of data to be transmitted by a second transmission system related to a transmission method according to the present embodiment. FIG. 10 represents "an example in which region information and region image data respectively corresponding to region 1, region 2, region 3, and region 4 shown in FIG. 9 are stored in the payload of a long packet of MIPI as shown in FIG. 3 to be transmitted per row."

"PH" shown in FIG. 10 denotes a packet header of the long packet. In this case, the packet header of the long packet according to the second transmission system may function as data (change information) indicating whether or not information included in the region information has changed from region information included in a packet to be last transmitted. In other words, "PH" shown in FIG. 10 can be considered data indicating a data type of the long packet.

As an example, when the information included in the region information has changed from region information included in a packet to be last transmitted, the image sensor 100 sets "0x38" to "PH". In this case, the image sensor 100 stores the region information in the payload of the long packet.

As another example, when the information included in the region information has not changed from region information included in a packet to be last transmitted, the image sensor 100 sets "0x39" to "PH". In this case, the image sensor 100 does not store the region information in the payload of the long packet. In other words, when the information included in the region information has not changed from region information included in a packet to be last transmitted, the image sensor 100 does not cause region information to be transmitted.

It is needless to say that the data to be set to "PH" is not limited to the example described above.

"Info" in FIG. 10 denotes region information stored in a payload. As shown in FIG. 10, region information is stored in a head portion of a payload.

Each of "1", "2", "3", and "4" shown in FIG. 10 corresponds to region image data of region 1, region image data of region 2, region image data of region 3, and region image data of region 4 to be stored in a payload. While each piece of region image data is shown divided in FIG. 10, the divisions are simply indicated for convenience's sake and the data stored in the payload is not divided.

In the second transmission system, region information and region image data respectively corresponding to region 1, region 2, region 3, and region 4 shown in FIG. 9 are stored in the payload of a long packet of MIPI as shown in, for example, FIG. 10 to be transmitted per row.

Therefore, when the second transmission system is used, the image sensor 100 is capable of transmitting a shape of an arbitrary region set to the image.

[4] Configuration Example of Image Sensor and Image Processing Apparatus Constituting Image Processing System According to Present Embodiment Next, an example of a configuration of the image sensor 100 capable of performing processing according to the transmission method described above and a configuration of the image processing apparatus 200 capable of performing processing according to the image processing method described above will be explained.

[4-1] Configuration of Image Sensor 100

Figure 11:
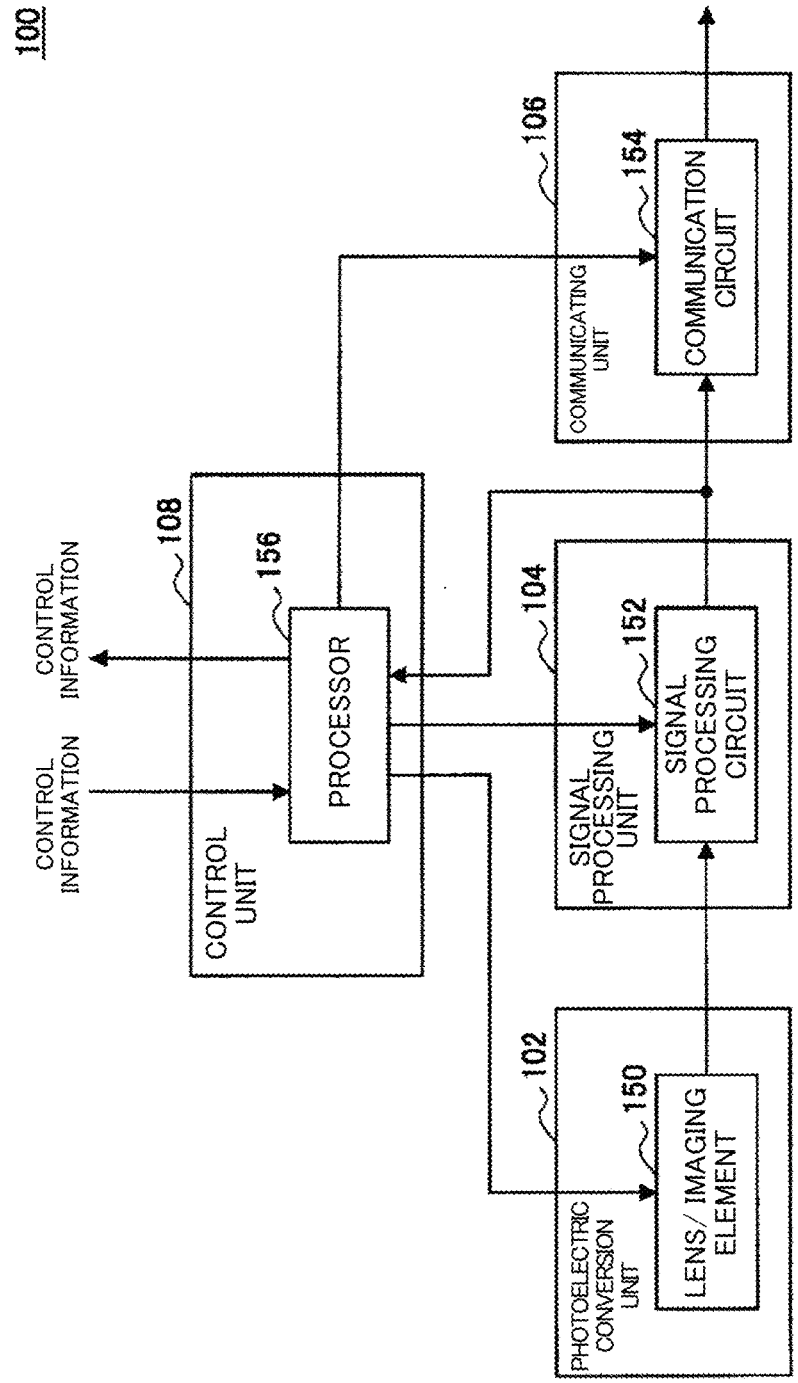
FIG. 11 is a block diagram showing an example of a configuration of an image sensor according to the present embodiment.

FIG. 11 is a block diagram showing an example of a configuration of the image sensor 100 according to the present embodiment. For example, the image sensor 100 includes a photoelectric conversion unit 102, a signal processing unit 104, a communicating unit 106, and a control unit 108. The image sensor 100 operates using power supplied from an internal power supply (not illustrated) that constitutes the image processing system 1000 such as a battery or power supplied from an external power supply of the image processing system 1000.

The photoelectric conversion unit 102 is constituted by a lens/imaging element 150 and the signal processing unit 104 is constituted by a signal processing circuit 152. The lens/imaging element 150 and the signal processing circuit 152 function as an image sensor device in the image sensor 100. In the image processing system 1000, all of the image sensors 100 may include image sensor devices of a same type or a part of the image sensors 100 may include image sensor devices of a different type. An example of image sensors 100 including image sensor devices of a different type is an image sensor 100 including an image sensor device that images a color image and an image sensor 100 including an image sensor device that images a black and white image.

The communicating unit 106 is constituted by a communication circuit 154 and the control unit 108 is constituted by a processor 156. Operations of each of the lens/imaging element 150, the signal processing circuit 152, and the communication circuit 154 are controlled by the processor 156.

It should be noted that the function blocks of the image sensor 100 shown in FIG. 11 have been created by dividing functions included in the image sensor 100 for convenience's sake and are not limited to the example shown in FIG. 11. For example, the signal processing unit 104 and the control unit 108 shown in FIG. 11 can also be considered a single processing unit.

The lens/imaging element 150 is constituted by, for example, a lens of an optical system and an image sensor using a plurality of imaging elements such as a CMOS (Complementary Metal Oxide Semiconductor) or a CCD (Charge Coupled Device). In the lens/imaging element 150, as light having passed through the lens of the optical system is photoelectrically converted by the imaging elements of the image sensor, an analog signal indicating a captured image is obtained.

For example, the signal processing circuit 152 includes an AGC (Automatic Gain Control) circuit and an ADC (Analog to Digital Converter) and converts an analog signal transmitted from the lens/imaging element 150 into a digital signal (image data). In addition, the signal processing circuit 152 includes an amplifier and amplifies the digital signal with a prescribed gain.

Furthermore, the signal processing circuit 152 may perform processing related to setting a region with respect to the image and transmit region designation information to the communication circuit 154. As will be described later, processing related to setting of a region with respect to the image in the image sensor 100 may be performed by the processor 156. In addition, as described earlier, in the image processing system 1000, processing related to setting of a region with respect to an image may be performed by an external apparatus such as the image processing apparatus 200.

Furthermore, the signal processing circuit 152 may transmit various pieces of data such as exposure information and gain information to the communication circuit 154. Transmission of various pieces of data such as exposure information and gain information to the communication circuit 154 in the image sensor 100 may be performed by the processor 156.

The communication circuit 154 is a circuit related to a data transmission function by the transmission method according to the present embodiment and an example of the communication circuit 154 is an IC (Integrated Circuit) chip in which circuits related to the transmission function are integrated. The communication circuit 154 processes image data transmitted from the signal processing circuit 152 and transmits date corresponding to a generated image.

Data corresponding to an image is image data transmitted from the signal processing circuit 152 (in other words, data indicating an entire image) or region information and region image data.

The processor 156 controls operations of each of the lens/imaging element 150, the signal processing circuit 152, and the communication circuit 154 based on, for example, a control signal transmitted from the image processing apparatus 200 via the control bus B2. Alternatively when the image sensor 100 provided with the processor 156 and another image sensor 100 are capable of directly communicating with each other, the processor 156 can perform processing based on a control signal transmitted from the other image sensor 100 via an arbitrary transmission path.

Examples of control of the lens/imaging element 150 by the processor 156 include control of imaging such as control of an exposure time. Examples of control of the signal processing circuit 152 by the processor 156 include control of signal processing such as control of a gain. Examples of control of the communication circuit 154 by the processor 156 include control of communication such as "control of switching between transmitting region image data and transmitting data indicating an entire image" and various types of control when transmitting region image data (for example, control of transmission of region information and control of transmission of information related to imaging).

The image sensor 100 performs processing related to the transmission method described above by for example, the configuration shown in FIG. 11. It is needless to say that the configuration of the image sensor 100 is not limited to the example shown in FIG. 11.

[4-2] Configuration of Image Processing Apparatus 200

Figure 12:
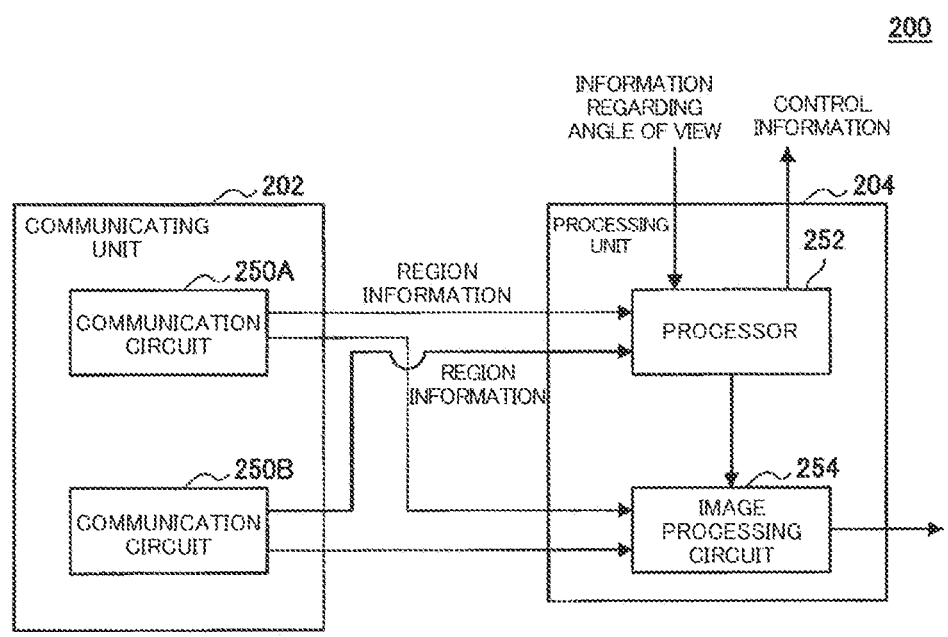
FIG. 12 is a block diagram showing an example of a configuration of an image processing apparatus according to the present embodiment.

FIG. 12 is a block diagram showing an example of a configuration of the image processing apparatus 200 according to the present embodiment. FIG. 12 shows an example of a configuration of the image processing apparatus 200 that constitutes the image processing system 1000 shown in FIG. 1 or, in other words, an example of a configuration which communicates with each of two image sensors 100, namely the image sensors 100A and 100B.

For example, the image processing apparatus 200 includes a communicating unit 202 and a processing unit 204. The image processing apparatus 200 operates using power supplied from an internal power supply (not illustrated) that constitutes the image processing system 1000 such as a battery or power supplied from an external power supply of the image processing system 1000.

The communicating unit 202 has a function of communicating with each of the plurality of image sensors 100. For example, the communicating unit 202 is constituted by communication circuits 250A and 250B which respectively correspond to the image sensor 100 that is a communication object. Hereinafter, one communication circuit among the communication circuits 250A and 250B that constitute the communicating unit 202 will be referred to as a "communication circuit 250".

In addition, the communicating unit 202 may be capable of switching among image sensors 100 that are communication objects. Using the image processing system 1000 shown in FIG. 1 as an example, switching of the image sensors 100 that are communication objects in the communicating unit 202 include switching among "communicate with only the image sensor 100A", "communicate with only the image sensor 100B", and "communicate with both the image sensor 100A and the image sensor 100B". The switching of the image sensors 100 that are communication objects in the communicating unit 202 is realized as, for example, operations of the communication circuits 250A and 250B are controlled by a processor 252. The processor 252 performs switching of the image sensors 100 that are communication objects by threshold processing based on a detected value of a sensor capable of detecting brightness such as an illuminance sensor (which may either be a sensor outside of the image processing apparatus 200 or a sensor included in the image processing apparatus 200). As an example, the processor 252 causes communication with both the image sensor 100A and the image sensor 100B to be performed when the detected value is equal to or smaller than a set threshold (or when the detected value is smaller than the threshold). As another example, the processor 252 causes communication with one of the image sensor 100A and the image sensor 100B to be performed when the detected value is larger than the threshold (or when the detected value is equal to or larger than the threshold). Since a data processing amount in the image processing apparatus 200 can be further reduced by having the processor 252 switch the image sensors 100 that are communication objects, a reduction in power consumption can be achieved.

In addition, when "communication with only the image sensor 100A" or "communication with only the image sensor 100B" is performed, the processor 252 may suspend operations of the image sensor 100 that does not perform communication. For example, the processor 252 performs switching of the image sensors 100 that are communication objects and suspension of operations of the image sensors 100 by threshold processing based on a detected value of a sensor capable of detecting brightness such as an illuminance sensor. By having the processor 252 suspend operations of the image sensors 100, a reduction in power consumption can be achieved in the image processing system 1000.

The processing unit 204 processes data received by the communicating unit 202. For example, the processing unit 204 performs processing related to the image processing method according to the present embodiment and, based on region information, associatively processes region image data acquired from each of the plurality of image sensors 100 for each region. Alternatively, the processing unit 204 can also process data indicating an entire image.

The processing unit 204 is constituted by the processor 252 and an image processing circuit 254. Operations of each of the communication circuits 250A and 250B and the image processing circuit 254 are controlled by the processor 252. In other words, the processing unit 204 may perform a role of a control unit in the image processing apparatus 200.

In addition, the processor 252 constituting the processing unit 204 performs a role of controlling operations of each of the image sensors 100 constituting the image processing system 1000. The processor 252 controls operations of each of the image sensors 100 by transmitting a control signal to the image sensors 100 via the control bus B2.

It should be noted that the function blocks of the image processing apparatus 200 shown in FIG. 12 have been created by dividing functions included in the image processing apparatus 200 for convenience's sake and are not limited to the example shown in FIG. 12. For example, the processing unit 204 shown in FIG. 12 can also be divided into a control unit constituted by the processor 252 and an image processing unit constituted by the image processing circuit 254.

The communication circuit 250A is, for example, a communication circuit that communicates with the image sensor 100A. The communication circuit 250A receives data (for example, the packet shown in FIG. 6 or FIG. 10) having been transmitted by the transmission method according to the present embodiment from the image sensor 100A. The communication circuit 250A may have a function of transmitting data to the image sensor 100A via, for example, an arbitrary transmission path between the communication circuit 250A and the image sensor 100A.

The communication circuit 250B is, for example, a communication circuit that communicates with the image sensor 100B. The communication circuit 250B receives data (for example, the packet shown in FIG. 6 or FIG. 10) having been transmitted by the transmission method according to the present embodiment from the image sensor 100B. The communication circuit 250B may have a function of transmitting data to the image sensor 100B via, for example, an arbitrary transmission path between the communication circuit 250B and the image sensor 100B.

The communication circuits 250A and 250B transmit data included in Embedded Data such as region information and information regarding imaging by the image sensors 100 among the received data to the processor 252. FIG. 12 shows "an example in which region information is transmitted to the processor 252 from each of the communication circuits 250A and 250B". The communication circuits 250A and 250B may transmit Embedded Data among the received data to the processor 252. When Embedded Data is transmitted to the processor 252, the data included in Embedded Data such as region information and information regarding imaging by the image sensors 100 is retrieved by the processor 252 from Embedded Data. In addition, the communication circuits 250A and 250B transmit data other than the Embedded Data included in the payload among the received data to the image processing circuit 254.

The communication circuits 250A and 250B separate header data corresponding to a header portion and payload data corresponding to a payload portion from the received data. The communication circuits 250A and 250B separate header data from the received data according to, for example, a rule defined in advance by a standard or the like. In addition, the communication circuits 250A and 250B may separate payload data from the received data or separate payload data from the received data based on contents indicated by the header data according to, for example, a rule defined in advance by a standard or the like. Furthermore, the communication circuits 250A and 250B transmit data included in Embedded Data (or Embedded Data) among the separated data to the processor 252 and transmit data other than the Embedded Data among the payload data to the image processing circuit 254.

Figure 13:
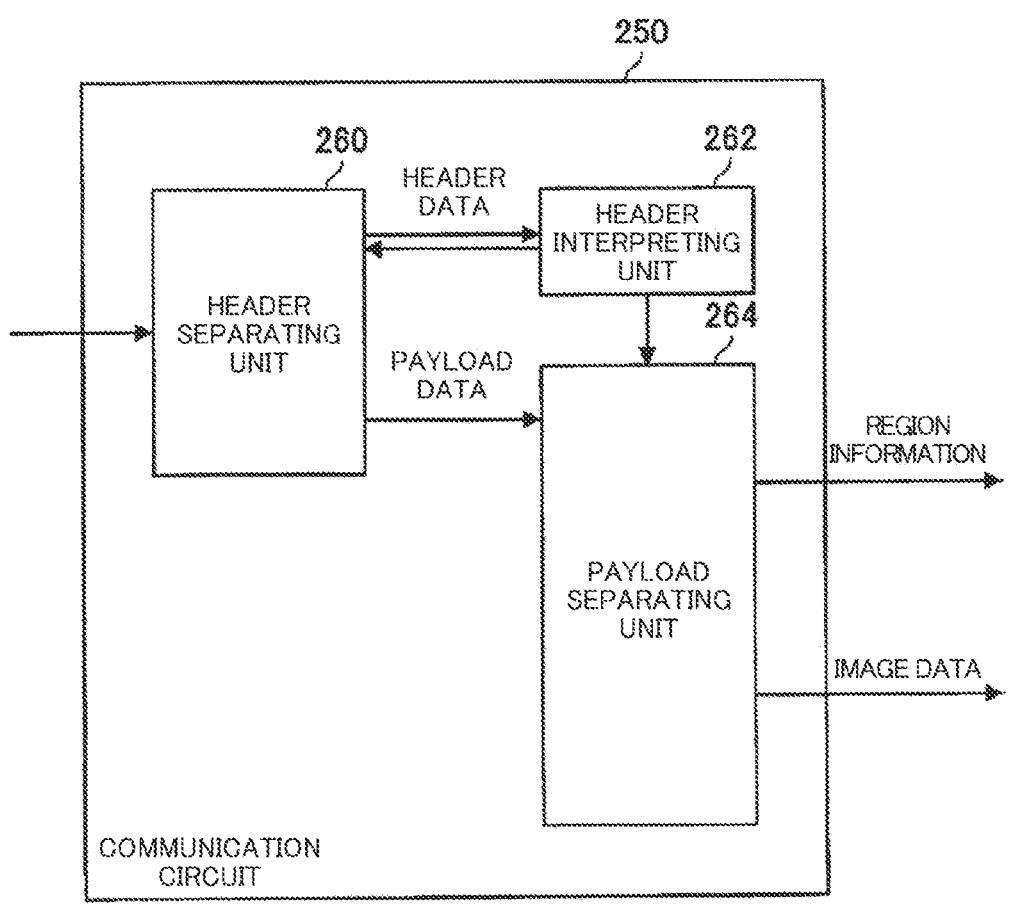
FIG. 13 is a block diagram showing an example of a functional configuration of a communication circuit included in the image processing apparatus according to the present embodiment.

FIG. 13 is a block diagram showing an example of a functional configuration of the communication circuit 250 included in the image processing apparatus 200 according to the present embodiment. For example, the communication circuit 250 includes a header separating unit 260, a header interpreting unit 262, and a payload separating unit 264.

The header separating unit 260 separates header data corresponding to a header portion and payload data corresponding to a payload portion from the received data. The header separating unit 260 separates header data from the received data according to, for example, a rule defined in advance by a standard or the like. In addition, the header separating unit 260 may separate payload data from the received data or separate payload data from the data received based on a result of processing by the header interpreting unit 262 according to, for example, a rule defined in advance by a standard or the like.

The header interpreting unit 262 interprets contents indicated by the header data.

As an example, the header interpreting unit 262 interprets whether or not payload data is "Embedded Data". The header interpreting unit 262 interprets whether or not payload data is "Embedded Data" based on, for example, a DT value recorded in the header portion. As another example, the header interpreting unit 262 may identify a position of payload data and transmit the identified position to the header separating unit 260.

The payload separating unit 264 processes the payload data based on a result of interpretation by the header interpreting unit 262.

As an example, when the header interpreting unit 262 interprets that the payload data is "Embedded Data", the payload separating unit 264 separates data included in Embedded Data such as region information and information regarding imaging by the image sensors 100 from the payload data. In addition, the payload separating unit 264 transmits the data included in Embedded Data such as region information and information regarding imaging by the image sensors 100 to the processing unit 204 (more specifically, the processor 252 constituting the processing unit 204). FIG. 13 shows "an example in which region information is transmitted to the processing unit 204 from the payload separating unit 264".

As another example, when the header interpreting unit 262 does not interpret that the payload data is "Embedded Data", the payload separating unit 264 separates image data (data indicating an entire image or region image data) from the payload data. The payload separating unit 264 separates region image data from the payload data based on, for example, region information retrieved from Embedded Data. In addition, the payload separating unit 264 transmits the image data to the processing unit 204 (more specifically the image processing circuit 254 constituting the processing unit 204).

Due to the communication circuit 250 having a functional configuration shown in, for example, FIG. 13, the communication circuit 250 receives data having been transmitted from the image sensor 100 by the transmission method according to the present embodiment and transmits the received data to the processing unit 204. It should be noted that the function blocks of the communication circuit 250 shown in FIG. 13 have been created by dividing functions included in the communication circuit 250 for convenience's sake and are not limited to the example shown in FIG. 13. In addition, as described above, the communication circuit 250 may be configured to transmit Embedded Data among the received data to the processor 252.

Once again referring to FIG. 12, an example of a configuration of the image processing apparatus 200 will be described. The processor 252 controls operations of each of the communication circuits 250A and 250B and the image processing circuit 254. In addition, the processor 252 may perform various kinds of processing such as processing for executing arbitrary application software.

Examples of control of the communication circuits 250A and 250B by the processor 252 include on/off control of a communication function. For example, by controlling on/off of the communication function of each of the communication circuits 250A and 250B as described above, switching among image sensors 100 that are communication objects is realized.

Control of the image processing circuit 254 by the processor 252 include control of processing related to the image processing method according to the present embodiment that is performed by the image processing circuit 254. The processor 252 performs control of the image processing circuit 254 using, for example, data included in Embedded Data such as region information and information regarding imaging by the image sensors 100 that is transmitted from the communication circuits 250A and 250B. In addition, when Embedded Data is transmitted from the communication circuits 250A and 250B, the processor 252 performs control of the image processing circuit 254 by for example, retrieving region information or the like from the Embedded Data.

As an example, the processor 252 transmits, to the image processing circuit 254, correction control information that indicates a correction value for aligning a relative position of an image indicated by the region image data. The correction value for aligning a relative position of an image indicated by the region image data is set based on, for example, region information included in Embedded Data transmitted from each of the communication circuits 250A and 250B and information regarding an angle of view acquired from each of the image sensors 100. Alternatively, the correction value for aligning a relative position of an image indicated by the region image data may be set based on, for example, region information included in Embedded Data transmitted from each of the communication circuits 250A and 250B and a result of performing arbitrary object detection processing with respect to each image indicated by the region image data.

As another example, the processor 252 transmits, to the image processing circuit 254, correction control information that indicates a correction gain for correcting a sensitivity ratio of each of the image sensors 100 having transmitted region image data.

The correction gain is set by calculating a correction gain "G12" that satisfies mathematical expression 1 below based on, for example, information regarding an angle of view that is acquired from each of the image sensors 100. It should be noted that the calculation of the correction gain based on mathematical expression 1 below is a calculation example in a case where the image processing apparatus 200 controls the image sensors 100 so that respective exposure times are the same. In other words, a calculation method of the correction gain according to the present embodiment is not limited to using mathematical expression 1 below.

$$G2 \cdot G2l = A1 \cdot G1/A2 \qquad \text{(Mathematical expression 1)}$$

In this case, "G1" in mathematical expression 1 presented above denotes a gain in the image sensor device included in the image sensor 100A and "G2" in mathematical expression 1 presented above denotes a gain in the image sensor device included in the image sensor 100B. In addition, "A1" in mathematical expression 1 presented above denotes a photoelectric conversion ratio in the image sensor device included in the image sensor 100A and "A2" in mathematical expression 1 presented above denotes a photoelectric conversion ratio in the image sensor device included in the image sensor 100B. In other words, a correction gain for correcting a signal level of an image indicated by region image data acquired from the image sensor 100B is calculated using mathematical expression 1 presented above.

The image processing circuit 254 processes data transmitted from each of the communication circuits 250A and 250B. For example, in the image processing circuit 254, the processing unit 204 performs processing related to the image processing method according to the present embodiment and, based on region information, associatively processes region image data acquired from each of the image sensors 100A and 100B for each region.

For example, the image processing circuit 254 matches a signal level of an image indicated by region image data using, for example, correction control information transmitted from the processor 252. After matching the signal level, the image processing circuit 254 aligns a relative position of an image indicated by the region image data using the correction control information transmitted from the processor 252. In addition, the image processing circuit 254 combines an image indicated by area image data for each region. It should be noted that the image processing circuit 254 is capable of combining an image indicated by region image data without having to match a signal level of the image indicated by region image data and is capable of combining an image indicated by region image data without having to align a relative position of the image indicated by region image data.

Alternatively, the image processing circuit 254 can also process data indicating an entire image acquired from each of the image sensors 100A and 100B.

In addition, processing in the image processing circuit 254 is not limited to the example described above. For example, the image processing circuit 254 may perform one of or both of processing related to control of recording of image data to a recording medium such as the memory 300 and processing related to control of display of an image on a display screen of the display device 400.

Figure 14:
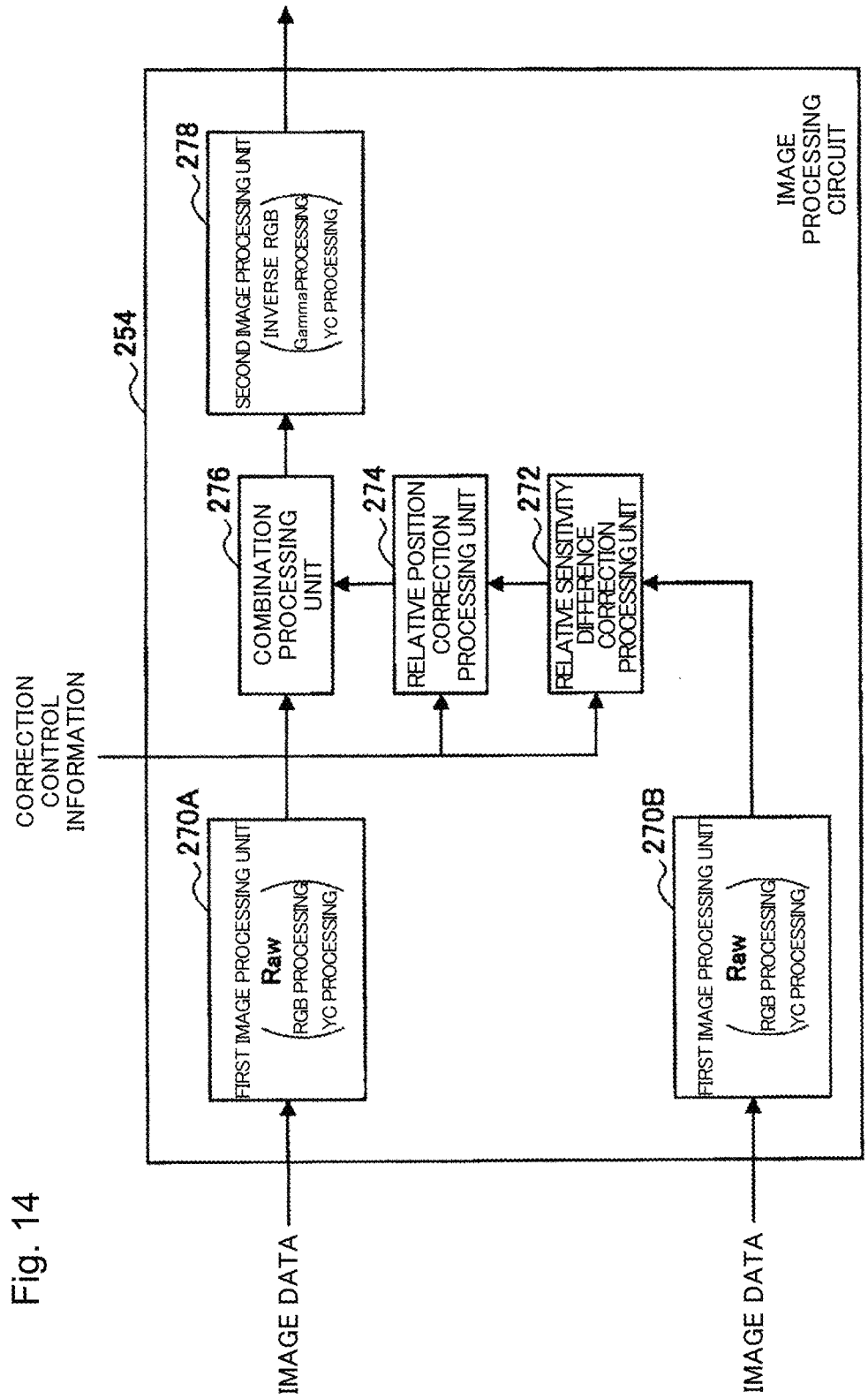
FIG. 14 is a block diagram showing an example of a functional configuration of an image processing circuit included in the image processing apparatus according to the present embodiment.

FIG. 14 is a block diagram showing an example of a functional configuration of the image processing circuit 254 included in the image processing apparatus 200 according to the present embodiment. For example, the image processing circuit 254 has first image processing units 270A and 270B, a relative sensitivity difference correction processing unit 272, a relative position correction processing unit 274, a combination processing unit 276, and a second image processing unit 278. Apart of or all of processing in each unit may be performed by hardware or performed by having software (a computer program) executed on hardware.

Hereinafter, an example of the functional configuration of the image processing circuit 254 will be described using a case where the image processing circuit 254 processes region image data as an example.

The first image processing unit 270A performs prescribed image processing with respect to data transmitted from the communication circuit 250A. The first image processing unit 270B performs prescribed image processing with respect to data transmitted from the communication circuit 250B. Examples of the prescribed image processing performed by each of the first image processing units 270A and 270B include various types of processing related to a RAW phenomenon or the like.

The relative sensitivity difference correction processing unit 272 matches a signal level of an image indicated by region image data transmitted from the first image processing unit 270B to a signal level of an image indicated by region image data having been processed by the first image processing unit 270A. The relative sensitivity difference correction processing unit 272 corrects a gain of the region image data transmitted from the first image processing unit 270B using, for example, a correction gain indicated by correction control information transmitted from the processor 252.

While FIG. 14 shows an example in which the gain of region image data transmitted from the first image processing unit 270B is corrected, the image processing circuit 254 may have a functional configuration for correcting a gain of the region image data transmitted from the first image processing unit 270A.

The relative position correction processing unit 274 aligns a relative position of an image indicated by region image data transmitted from the relative sensitivity difference correction processing unit 272 to an image indicated by region image data having been processed by the first image processing unit 270A. The relative position correction processing unit 274 corrects a relative position of an image indicated by the region image data transmitted from the relative sensitivity difference correction processing unit 272 using, for example, a correction gain for aligning a relative position indicated by correction control information transmitted from the processor 252.

The combination processing unit 276 combines, for each region, an image indicated by region image data processed by the first image processing unit 270A and an image indicated by region image data transmitted from the relative position correction processing unit 274. The combination processing unit 276 combines images indicated by pieces of region image data by arbitrary processing that enables images to be combined such as alpha blending.

The second image processing unit 278 performs prescribed image processing with respect to a combined image transmitted from the combination processing unit 276. Examples of the prescribed image processing performed by the second image processing unit 278 includes arbitrary processing that can be performed with respect to image data such as Gamma processing.

Due to the image processing circuit 254 having a functional configuration shown in, for example, FIG. 14, the image processing circuit 254 performs processing related to the image processing method according to the present embodiment. It should be noted that the function blocks of the image processing circuit 254 shown in FIG. 14 have been created by dividing functions included in the image processing circuit 254 for convenience's sake and are not limited to the example shown in FIG. 14.

The image processing apparatus 200 performs processing related to the image processing method described above by, for example, the configuration shown in FIG. 12 to FIG. 14. It is needless to say that the configuration of the image processing apparatus 200 is not limited to the example shown in FIG. 12 to FIG. 14.

[5] Example of Processing in Image Processing System According to Present Embodiment Next, an example of processing in the image processing system 1000 will be described.

[5-1] Processing Related to Initialization

Figure 15:
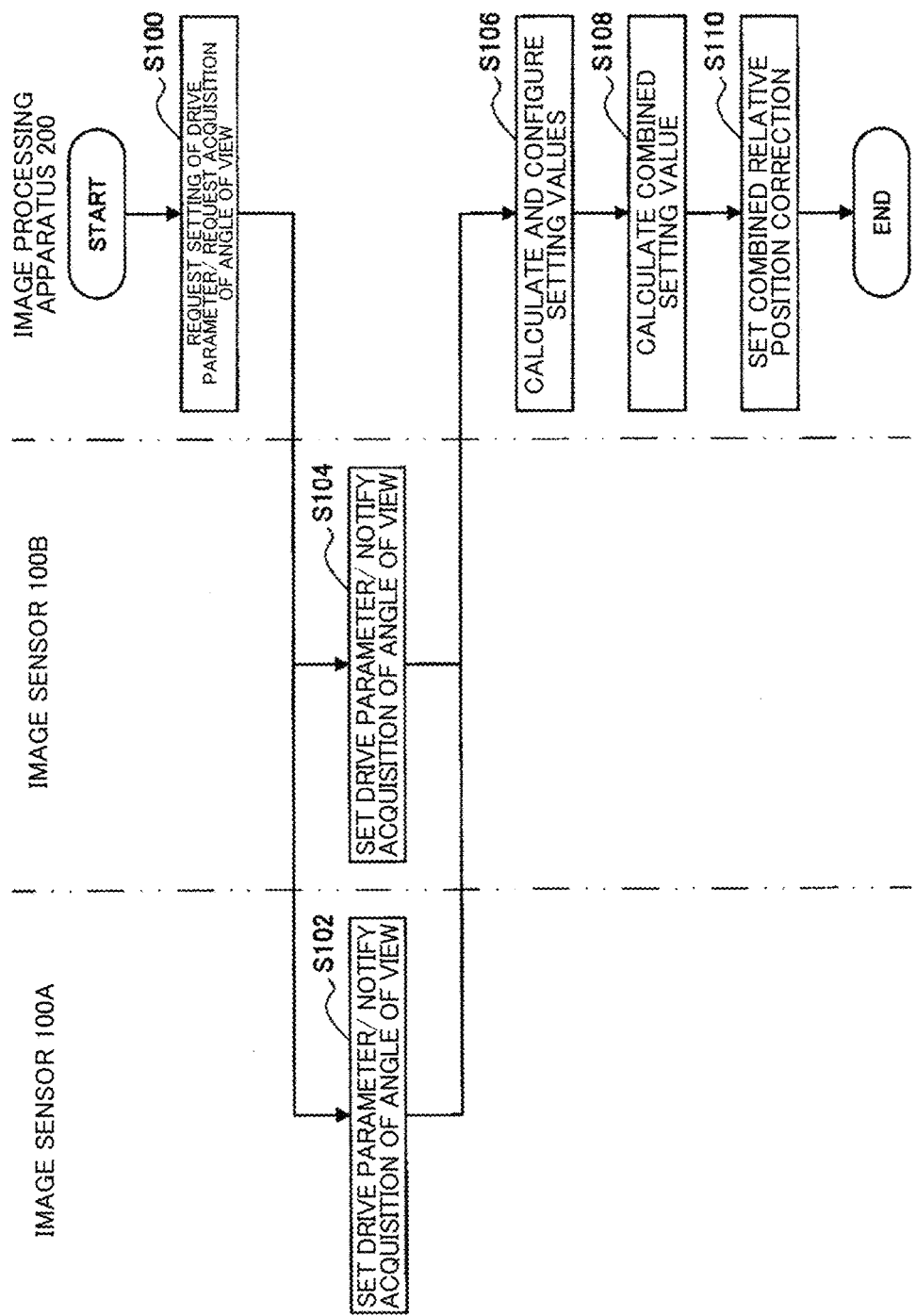
FIG. 15 is an explanatory diagram for explaining an example of processing in the information processing system according to the present embodiment.

FIG. 15 is an explanatory diagram for explaining an example of processing in the image processing system 1000 according to the present embodiment and shows an example of processing related to initialization. The processing shown in FIG. 15 is performed when, for example, the image processing system 1000 is activated or when a prescribed operation is performed by a user of the image processing system 1000 or the like.

The image processing apparatus 200 transmits a setting request to have each of the image sensors 100A and 100B set a drive parameter and an acquisition request to have each of the image sensors 100A and 100B transmit information regarding an angle of view via, for example, the control bus B2 (S100). For example, the setting request of a drive parameter includes various setting values such as an exposure value, an exposure time, and a gain and a setting command. For example, the acquisition request includes a transmission command of information related to an angle of view.

Each of the image sensors 100A and 100B having received the setting request and the acquisition request transmitted in step S100 sets a drive parameter based on the setting request and transmits information related to an angle of view based on the acquisition request (S102, S104).

The image processing apparatus 200 having transmitted the setting request in step S100 calculates a correction gain based on various setting values included in the setting request and configures settings for performing correction according to the calculated correction gain (S106).

The image processing apparatus 200 having received information regarding the angle of view transmitted in steps S102 and S104 obtains a correction value for aligning relative positions based on the information regarding the angle of view (S108) and configures settings for performing correction according to the correction value (S110).

In the image processing system 1000, for example, processing shown in FIG. 15 is performed as processing related to initialization. It is needless to say that the example of processing related to initialization is not limited to the example shown in FIG. 15.

[5-2] Processing During Operation

Figure 16:
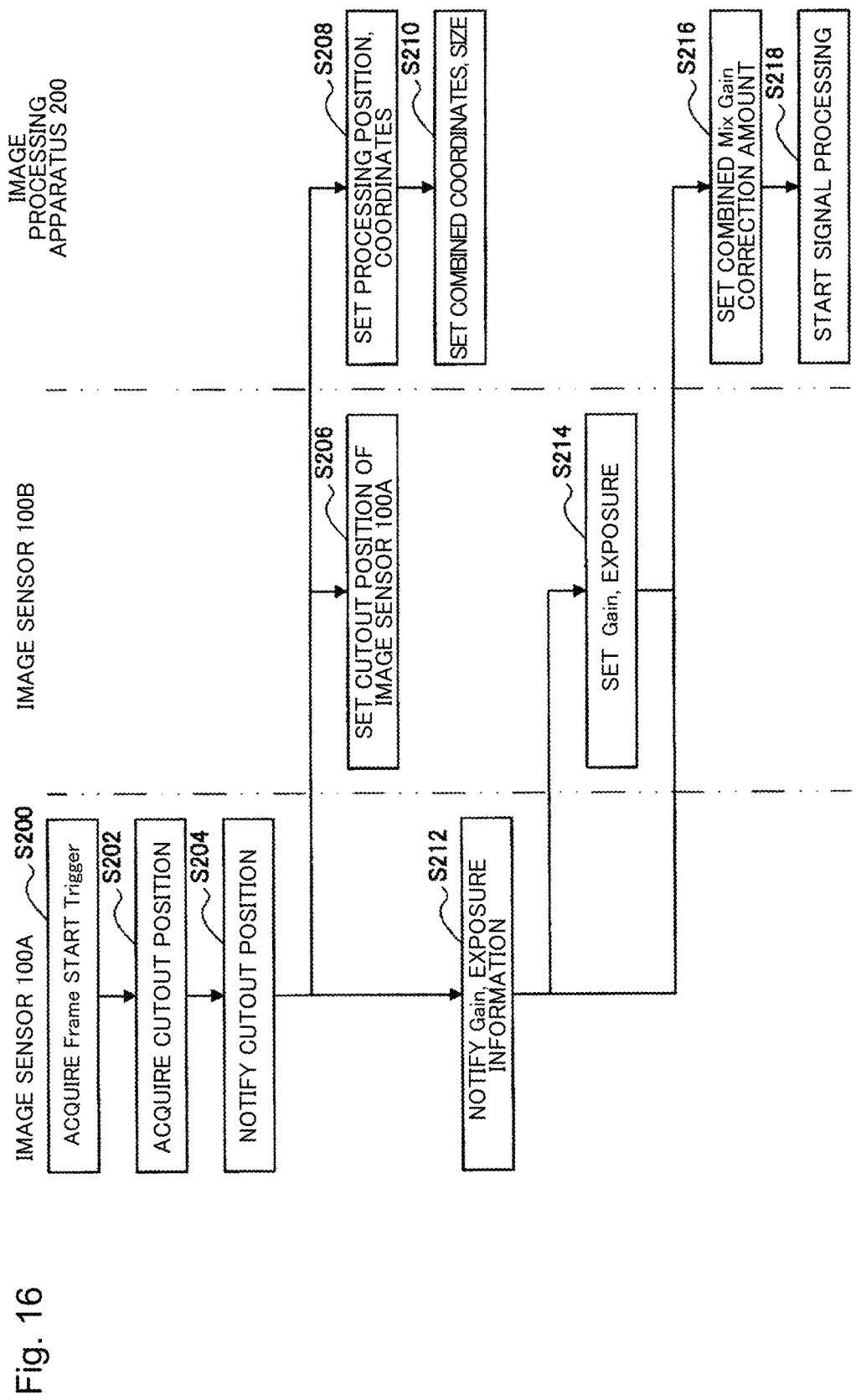
FIG. 16 is an explanatory diagram for explaining an example of processing in the information processing system according to the present embodiment.

FIG. 16 is an explanatory diagram for explaining an example of processing in the image processing system 1000 according to the present embodiment and shows an example of processing during operation. FIG. 16 shows an example in which processing by the image sensor 100B is performed with imaging by the image sensor 100A as a reference. In other words, the image processing system 1000 can perform coordinated imaging by having one image sensor 100 function as a master image sensor and having another image sensor 100 function as a slave image sensor.

The image sensor 100A starts imaging upon acquiring a frame start trigger (hereinafter, sometimes referred to as a "V Start Trigger") (S200).

The image sensor 100A sets a cutout position to be cut out from a captured image (S202) and transmits information indicating the set cutout position to the image sensor 100B and the image processing apparatus 200 (S204). Setting of the cutout position in the image sensor 100A corresponds to setting a region with respect to the captured image. In other words, for example, the information indicating the cutout position corresponds to region information.

The image sensor 100A transmits information indicating the cutout position to the image processing apparatus 200 via, for example, the data bus B1. In addition, the image sensor 100A transmits information (region information: hereinafter, a similar description will apply) indicating the cutout position to the image sensor 100B via, for example, the image processing apparatus 200. In a case of a configuration in which the image sensor 100A and the image sensor 100B are capable of communicating with each other by inter-processor communication or the like, the image sensor 100A may transmit information indicating the cutout position to the image sensor 100B by direct communication.

The image sensor 100B having received information indicating a cutout position transmitted from the image sensor 100A in step S204 sets a cutout position to be cut out from a captured image based on the information indicating the cutout position (S206).

The image processing apparatus 200 having received information indicating a cutout position transmitted from the image sensor 100A in step S204 identifies the number of pixels included in the set region and two-dimensional planar coordinates of the pixels based on the information indicating the cutout position (S208) and sets coordinates and a size of a region to be used in processing (S210).

The image sensor 100A having transmitted the information indicating a cutout position in step S204 transmits information regarding imaging in the image sensor 100A to the image sensor 100B and the image processing apparatus 200 (S212). As described earlier, information regarding imaging includes exposure information and gain information. The image sensor 100A transmits information regarding imaging to the image sensor 100B and the image processing apparatus 200 in a similar manner to, for example, the transmission of information indicating a cutout position in step S204.

The image sensor 100B having received the information regarding imaging transmitted from the image sensor 100A in step S212 performs gain control and exposure control based on the received information regarding imaging (S214). In addition, the image sensor 100B transmits information regarding imaging in the image sensor 100B to the image processing apparatus 200.

The image processing apparatus 200 having received the information regarding imaging transmitted from the image sensor 100A in step S212 and the information regarding imaging transmitted from the image sensor 100B calculates, for example, a correction gain and configures settings for performing correction according to the calculated correction gain (S216). In addition, the image processing apparatus 200 starts processing with respect to image data transmitted from each of the image sensors 100A and 100B (S218).

FIG. 17 is an explanatory diagram for explaining an example of processing in the image processing system 1000 according to the present embodiment and shows a timing chart corresponding to the processing shown in FIG. 16. In other words, FIG. 17 shows "an example in which the image sensor 100A functions as a master image sensor and the image sensor 100B functions as a slave image sensor" in a similar manner to FIG. 16.

As shown in FIG. 17, in the image processing system 1000, the image sensor 100A and the image sensor 100B cooperate with each other to perform imaging in accordance with a notification of settings in the image sensor 100A. In addition, in the image processing system 1000, the image processing apparatus 200 associatively processes region image data acquired from each of the image sensors 100A and 100B for each region based on a notification of settings in the image sensor 100A. Therefore, coordinated operations of the image sensor 100A, the image sensor 100B, and the image processing apparatus 200 are realized in the image processing system 1000.

In the image processing system 1000, for example, processing shown in FIG. 16 and FIG. 17 is performed as processing during operation. It is needless to say that the example of processing during operation is not limited to the example shown in FIG. 16 and FIG. 17.

[6] Example of Advantageous Effect Produced by Using Image Processing System According to Present Embodiment For example, using the image processing system according to the present embodiment produces the advantageous effects described below. It is needless to say that the advantageous effects produced by using the image processing system according to present embodiment is not limited to the examples described below.

- In the image processing system according to the present embodiment, imaging of a region set with respect to a captured image can be performed by cooperation among a plurality of the image sensors 100.
- In the image processing system according to the present embodiment, since the plurality of image sensors and the image processing apparatus operate in cooperation with each other, for example, the apparatuses can operate while sharing various kinds of information such as information on an exposure time, a drive frequency a gain value, a difference in relative angles of view between image sensor devices, and subject distance.
- Since the image processing apparatus is capable of combining images indicated by region image data by matching signal levels of the images, the image processing system according to the present embodiment is capable of enhancing sensitivity of images to be associatively processed.
- The image processing apparatus is capable of switching among image sensors that are communication objects and suspending operations of a part of the image sensors in conjunction with such switching. Therefore, the image processing system according to present embodiment is capable of achieving a reduction in power consumption.

Program According to Present Embodiment

By having a processor or an image processing circuit in a computer execute a program that causes the computer to function as the image processing apparatus according to the present embodiment (for example, a program that causes the computer to execute processing related to the image processing method according to the present embodiment), images respectively obtained from a plurality of image sensors can be associatively processed.

In addition, by having a processor or an image processing circuit in a computer execute a program that causes the computer to function as the image processing apparatus according to the present embodiment, advantageous effects to be produced through the use of the image processing method according to the present embodiment can be produced.

While a preferred embodiment of the present disclosure has been described in detail with reference to the accompanying drawings, the technical scope of the present disclosure is not limited thereto. It will be obvious to a person with ordinary skill in the art to which the technical field of the present disclosure pertains that various modifications and changes can be arrived at without departing from the scope of the technical ideas as set forth in the appended claims and, as such, it is to be understood that such modifications and changes are to be naturally covered in the technical scope of the present disclosure.

For example, while a program (a computer program) that causes a computer to function as the image processing apparatus according to the present embodiment is provided in the description given above, the present embodiment can also provide a recording medium storing the program described above.

The configuration described above represents an example of the present embodiment and naturally falls within the technical scope of the present disclosure.

Furthermore, the advantageous effects described in the present specification are merely descriptive or exemplary and not restrictive. In other words, the technique according to the present disclosure can produce, in addition to or in place of the advantageous effects described above, other advantageous effects that will obviously occur to those skilled in the art from the description of the present specification.

The following configurations are also covered in the technical scope of the present disclosure.

(1)

An image processing apparatus, including:
a communicating unit capable of communicating with each of a plurality of image sensors configured to transmit, in respectively different packets, additional data including region information corresponding to a region set with respect to a captured image for each region and region image data indicating an image for each row corresponding to the region; and
a processing unit configured to process, in association with each region, the region image data acquired from each of the plurality of image sensors based on the region information included in the additional data acquired from each of the plurality of image sensors, wherein
the region information includes a part of or all of identification information of the region, information indicating a position of the region, and information indicating a size of the region.

(2)

The image processing apparatus according to (1), wherein the processing unit is configured to combine images indicated by the region image data acquired from each of the plurality of image sensors for each region.

(3)

The image processing apparatus according to (2), wherein the processing unit is configured to combine images indicated by the region image data of an object to be combined by aligning relative positions of the images.

(4)

The image processing apparatus according to (2) or (3), wherein the additional data includes information regarding imaging in the image sensor, and the processing unit is configured to combine images indicated by the region image data of an object to be combined by matching signal levels of the images based on information regarding the imaging having been acquired from each of the plurality of image sensors.

(5)

The image processing apparatus according to any one of (1) to (4), wherein the communicating unit is configured to be capable of switching among image sensors that are communication objects.

(6)

The image processing apparatus according to any one of (1) to (5), wherein the packet is a long packet of MIPI (Mobile Industry Processor Interface Alliance).

(7)

An image processing system, including:
a plurality of image sensors configured to transmit, in respectively different packets, additional data including region information corresponding to a region set with respect to a captured image for each region and region image data indicating an image for each row corresponding to the region; and
an image processing apparatus, wherein
the image processing apparatus includes:
a communicating unit capable of communicating with each of the plurality of image sensors; and
a processing unit configured to process, in association with each region, the region image data acquired from each of the plurality of image sensors based on the region information included in the additional data acquired from each of the plurality of image sensors, and
the region information includes a part of or all of identification information of the region, information indicating a position of the region, and information indicating a size of the region.

REFERENCE SIGNS LIST 100, 100A, 100B Image sensor
102 Photoelectric conversion unit
104 Signal processing unit
106, 202 Communicating unit
150 Lens/imaging element
152 Signal processing circuit
154, 250, 250A, 250B Communication circuit
156, 252 Processor
200 Image processing apparatus
204 Processing unit
254 Image processing circuit
260 Header separating unit
262 Header interpreting unit
264 Payload separating unit
270A, 270B First image processing unit
272 Relative sensitivity difference correction processing unit
274 Relative position correction processing unit
276 Combination processing unit
278 Second image processing unit
300 Memory
400 Display device
1000 Image processing system
B1 Data bus
B2 Control bus

The invention claimed is:

1. An image processing apparatus, comprising:
communication circuitry configured to communicate with each of a plurality of image sensors configured to transmit, in respectively different packets, additional data including region information corresponding to a region set with respect to a captured image for each region and region image data indicating an image for each row corresponding to the region, the plurality of image sensors including a first image sensor and a second image sensor, the region image data including first region image data and second region image data; and
processing circuitry configured to process, in association with each region, the region image data acquired from each of the plurality of image sensors based on the region information included in the additional data acquired from each of the plurality of image sensors, wherein
the region information includes a part of or all of identification information of the region, information indicating a position of the region, and information indicating a size of the region,
combining the images includes combining a first image indicated by the first region image data from the first image sensor and a second image indicated by the second region image data from the second image sensor,
the processing circuitry corrects a signal level of the first image by correcting a gain of the first region image data based on correction control information, and
the correction control information is generated based on a gain of the second region image data.

2. The image processing apparatus according to claim 1, wherein the processing circuitry is configured to combine images indicated by the region image data of an object to be combined by aligning relative positions of the images.

3. The image processing apparatus according claim 1, wherein
the additional data includes information regarding imaging in a respective image sensor, and
the processing circuitry is configured to combine images indicated by the region image data of an object to be combined by matching signal levels of the images based on information regarding the imaging having been acquired from each of the plurality of image sensors.

4. The image processing apparatus according to claim 1, wherein the communication circuitry is configured to switch among the plurality of image sensors, and the plurality of image sensors are communication objects.

5. The image processing apparatus according to claim 1, wherein the packets are long packets of MIPI (Mobile Industry Processor Interface Alliance).

6. An image processing system, comprising:
a plurality of image sensors configured to transmit, in respectively different packets, additional data including region information corresponding to a region set with respect to a captured image for each region and region image data indicating an image for each row corresponding to the region, the plurality of image sensors including a first image sensor and a second image sensor, the region image data including first region image data and second region image data; and
an image processing apparatus, wherein
the image processing apparatus includes:
communication circuitry configured to communicate with each of the plurality of image sensors; and
processing circuitry configured to process, in association with each region, the region image data acquired from each of the plurality of image sensors based on the region information included in the additional data acquired from each of the plurality of image sensors, wherein
the region information includes a part of or all of identification information of the region, information indicating a position of the region, and information indicating a size of the region,
combining the images includes combining a first image indicated by the first region image data from the first image sensor and a second image indicated by the second region image data from the second image sensor,
the processing circuitry corrects a signal level of the first image by correcting a gain of the first region image data based on correction control information, and
the correction control information is generated based on a gain of the second region image data.

7. The image processing system according to claim 6, wherein the processing circuitry is configured to combine images indicated by the region image data of an object to be combined by aligning relative positions of the images.

8. The image processing system according to claim 6, wherein
the additional data includes information regarding imaging in a respective image sensor, and
the processing circuitry is configured to combine images indicated by the region image data of an object to be combined by matching signal levels of the images based on information regarding the imaging having been acquired from each of the plurality of image sensors.

9. The image processing system according to claim 6, wherein the communication circuitry is configured to switch among the plurality of image sensors, and the plurality of image sensors are communication objects.

10. The image processing system according to claim 6, wherein the packets are long packets of MIPI (Mobile Industry Processor Interface Alliance).

* * * * *